(12) United States Patent
Moctezuma Espiricueto et al.

(10) Patent No.: US 8,981,008 B2
(45) Date of Patent: Mar. 17, 2015

(54) TAPERED TRIBLOCK COPOLYMERS

(75) Inventors: Sergio Alberto Moctezuma Espiricueto, Altamira (MX); Enrique María Montero Carnerero, Santander (ES); Gabriel Hernández Zamora, Tampico (MX); Alejandro Claudio Esquivel De la Garza, Madero (MX); Martha Belem Mendieta García, Madero (MX); Gabriela Elizabeth Blanco Reyes, Madero (MX)

(73) Assignee: Dynasol Elastómeros, S.A. de C.V., Altamira (MX)

( * ) Notice: Subject to any disclaimer, the term of this patent is extended or adjusted under 35 U.S.C. 154(b) by 342 days.

(21) Appl. No.: 13/361,740

(22) Filed: Jan. 30, 2012

(65) Prior Publication Data

US 2012/0196996 A1 Aug. 2, 2012

Related U.S. Application Data

(60) Provisional application No. 61/437,671, filed on Jan. 30, 2011.

(51) Int. Cl.
| | |
|---|---|
| C08L 95/00 | (2006.01) |
| C08L 53/02 | (2006.01) |
| C08F 297/04 | (2006.01) |
| C09J 153/02 | (2006.01) |

(52) U.S. Cl.
CPC ............. *C08F 297/04* (2013.01); *C09J 153/02* (2013.01); *C08L 95/00* (2013.01); *Y10S 525/94* (2013.01)
USPC ............ 525/314; 525/316; 525/338; 525/940

(58) Field of Classification Search
CPC ....... C09J 153/02; C08L 53/02; C08F 297/04
USPC ................. 525/314, 316
See application file for complete search history.

(56) References Cited

U.S. PATENT DOCUMENTS

| | | | |
|---|---|---|---|
| 3,149,182 A | | 9/1964 | Porter |
| 3,281,383 A | | 10/1966 | Zelinsky et al. |
| 3,753,936 A | | 8/1973 | Marrs |
| 4,049,753 A | * | 9/1977 | Moczygemba ............... 525/314 |
| 4,073,831 A | | 2/1978 | Tabana et al. |
| 4,075,285 A | | 2/1978 | Tabana et al. |
| 4,208,356 A | | 6/1980 | Fukawa et al. |
| 4,396,743 A | | 8/1983 | Fujimaki et al. |
| 4,530,652 A | | 7/1985 | Buck et al. |
| 5,047,484 A | | 9/1991 | Tung |
| 5,071,920 A | | 12/1991 | Tung |
| 5,100,938 A | | 3/1992 | Vitkuske et al. |
| 5,159,022 A | | 10/1992 | Ikematu et al. |
| 5,191,024 A | | 3/1993 | Shibata et al. |
| 5,256,736 A | * | 10/1993 | Trepka et al. ................ 525/314 |
| 5,306,778 A | | 4/1994 | Ishida et al. |
| 5,554,697 A | | 9/1996 | Van Dijk et al. |
| 5,705,569 A | | 1/1998 | Moczygemba et al. |
| 5,854,335 A | | 12/1998 | Heimerikx et al. |
| 5,910,546 A | * | 6/1999 | Trepka et al. ................ 525/314 |
| 5,948,527 A | | 9/1999 | Gerard et al. |
| 6,759,454 B2 | | 7/2004 | Stephens et al. |
| 7,101,941 B2 | | 9/2006 | Desbois et al. |
| 7,223,816 B2 | | 5/2007 | Handlin et al. |
| 7,288,612 B2 | | 10/2007 | Desbois et al. |
| 7,517,934 B2 | | 4/2009 | Deeter et al. |
| 2003/0176582 A1 | | 9/2003 | Bening et al. |
| 2007/0225427 A1 | | 9/2007 | Wright et al. |
| 2009/0137704 A1 | | 5/2009 | Rojas Garcia et al. |
| 2009/0299010 A1 | | 12/2009 | Kluttz et al. |

OTHER PUBLICATIONS

Nairn "Polymer Structure and Characterization" 2007.*
International Search Report and Written Opinion of the International Searching Authority issued Oct. 2, 2012, for corresponding International Application No. PCT/IB2012/000244.
Technical Data Sheet, Solprene® 1205, Dec. 2003, 1 sheet, Dynasol Elastómeros, S.A. de C.V., Altamira, Tamaulipas, Mexico.

\* cited by examiner

*Primary Examiner* — Mark Kaucher
(74) *Attorney, Agent, or Firm* — Stephen S. Hodgson

(57) ABSTRACT

A tapered triblock copolymer having controlled vinyl distribution, enlarged middle block with intermediate composition and microstructure, increased compatibility between its adjacent blocks, good processing characteristics and a peak average molecular weight between 25,000 and 300,000 is made by anionically polymerizing conjugated diene and monovinyl aromatic monomers, polar modifier and initiator to make a first block rich in conjugated diene, forming a second block that is a copolymer of the conjugated diene and the monovinyl aromatic monomer and which is less rich in the conjugated diene than the first block, and forming a third block that is a homopolymer of the monovinyl aromatic monomer. The first, second and third blocks comprise 30 to 60, 20 to 50 wt % and 10 to 40 wt % of the tapered triblock copolymer, respectively. The tapered triblock copolymers may be used as asphalt modifiers, adhesives, sealants, compatibilizers, reinforcing agents and impact modifiers.

40 Claims, No Drawings

TAPERED TRIBLOCK COPOLYMERS

CROSS-REFERENCE TO RELATED APPLICATION

This application claims priority to U.S. Provisional Patent Application Ser. No. 61/437,671 filed on Jan. 30, 2011, by the same inventors, and the priority application is incorporated by reference.

BACKGROUND OF INVENTION

1. Field of the Invention

The invention relates to tapered triblock copolymers, reinforced materials containing the polymers, and articles made from the reinforced materials.

2. Description of the Related Art

Anionic polymerization is a well-known technique for manufacturing plastics and elastomers. Due to the "living" character of the polymer chains during the anionic polymerization process, anionic polymerization allows for the production of polymers having well-defined polymer blocks and narrow molecular weight distributions. Anionic polymerization has long been used to polymerize conjugated dienes such as butadiene and isoprene and to copolymerize such conjugated dienes with other anionically polymerizable monomers, such as monovinyl aromatics and substituted monovinyl aromatics. Commercial polymers commonly made through the anionic polymerization process include plastics such as polystyrene, elastomers such as polybutadiene, polyisoprene and styrene-diene rubbers, and thermoplastic elastomers such as block copolymers of styrene, butadiene and isoprene with varying sizes and numbers of blocks.

Many commercial applications for polymers prepared by anionic polymerization may be found in the literature. The polymers prepared by anionic polymerization may be useful in their own right as elastomers for tires and other industries, adhesives, sealants and coatings. In addition polymers prepared by anionic polymerization may be used to modify the characteristics of various materials such as asphalt, plastics and rubbers. For example, the polymers prepared by anionic polymerization may be used as compatibilizers and reinforcing agents in asphalt and compatibilizers or tie layers in polymer blends. The polymers prepared by anionic polymerization may be used as impact modifiers, reinforcing agents or viscosity modifiers in plastics used to manufacture molded and extruded goods such as injection molded parts and engineering components, films and fibers.

The polymers prepared by anionic polymerization may be modified in order to improve their characteristics for their intended applications. Many modification routes have been developed over the years. The most common modifications routes include: molecular weight; molecular weight distribution; monomer composition; diene microstructure; monomer sequence length distribution; stereochemistry; monomer addition order and sequencing; chain coupling through reactions of multifunctional species with living anions to synthesize polymers with linear, radial, comb, arm-like, branched or hyper-branched structures; and combinations of the above modifications. More sophisticated modifications routes include: introducing chemical functionalities through end-capping reactions or functional initiators; polymerization with multifunctional initiators to directly synthesize polymers with linear, radial, comb, arm-like, branched or hyper-branched structures; hydrogenation of residual double bonds; and combinations of the above modifications.

Among the polymers prepared by anionic polymerization, tapered diblock copolymers of conjugated diene and monovinyl aromatic monomers have been of long-lasting commercial importance due to its performance in many applications and its unique properties. Special processing characteristics such as high extrudability and excellent flow combined with mechanical properties such as high hardness, low shrinkage and high abrasion resistance, have been a desirable polymer properties balance for many high-productivity applications.

U.S. Patent Application Pub. No. 20030176582, which lists Bening et al. as inventors and is incorporated by reference, was published on Sep. 18, 2003. Paragraphs [0030] to [0035] describe an A-B-C triblock copolymer. Block A is a mono alkenyl arene polymer block. Block B is a controlled distribution copolymer block of at least one conjugated diene and at least one mono alkenyl arene. Block C is a conjugated diene polymer block. U.S. Pat. No. 5,191,024, issued to Shibata et al. on Mar. 2, 1993, and incorporated by reference, provides examples of triblock copolymers. Example 25 describes polymerizing styrene in tetrahydrofuran to make an A block, followed by polymerizing 600 g of 1,3 butadiene with 170 g of styrene to make a block B, and a block C was made by polymerizing 95 g of 1,3 butadiene with 95 g of styrene monomer. Examples 51-54 and comparative example 25 also describe triblock copolymers. U.S. Pat. No. 4,075,285, issued to Tabana et al. on Feb. 21, 1978 and incorporated by reference, describes various multiple-block copolymers that contain a rubber-modified polystyrene block and a styrene-butadiene block copolymer block. One example describes making a triblock copolymer having a first styrene block, a second styrene-butadiene block and a third styrene block. These patent documents are merely several of many documents that describe how materials can be made that have different properties.

However, it is still highly desirable to improve on the balance between processing and mechanical properties for the ultimate performance. It is desirable to further modify tapered block copolymers prepared by anionic polymerization to improve their performance in different applications and improve on properties such as compatibility, miscibility, adhesion or dispersibility in or with other materials when the polymers are included in a physical or reactive blend. For example, many styrene/butadiene-based and styrene/isoprene-based polymers prepared by anionic polymerization are insufficiently compatible and have met with limited success in the reinforcement of asphalt for paving and roofing applications. Although styrene/butadiene-based and styrene/isoprene-based polymers, both linear and non-linear, are widely used in reinforcing asphalt, problems related to the dispersibility of the polymers prepared by anionic polymerization in the asphalt formulations and to the morphology stability of the resulting polymer modified asphalt blends ultimately have a negative effect on the storage and long-term performance of the modified asphalt. Similar problems have arisen in applications where anionically polymerized polymers are used as pressure sensitive adhesives and hot melt adhesives and when the polymers prepared by anionic polymerization are used as impact modifiers in plastics for (co) extrusion or (co)injection molding applications.

Thus, it would be desirable to develop a method for preparing polymers by anionic polymerization to produce modified tapered block copolymers that are more processable, dispersible and compatible with a wide variety of materials and other substrates, including asphalt, adhesive and sealant ingredients, rubber and plastic, and suitable for a broad range of applications. The desired overall performance for an application of the modified tapered block copolymers in blends with the above referred materials and substrates is a balance between maximized processing characteristics such as melt viscosity, extrudability, and flow; increased dispersibility and compatibility to provide higher blend stability; and good elastomeric and thermoplastic properties.

SUMMARY OF THE INVENTION

The present invention provides tapered triblock copolymers, methods for producing the polymers, polymer blends and mixtures containing the polymers, reinforced materials containing the polymers and articles made from the reinforced materials are provided.

One aspect of the invention provides novel tapered triblock copolymers made of conjugated diene monomers and monovinyl aromatic monomers. The novel tapered triblock copolymers are characterized in having controlled vinyl distribution (1,2-diene microstructure), enlarged middle block with intermediate composition and microstructure, increased compatibility between its adjacent blocks and maximized processing characteristics.

The novel tapered triblock copolymers according to the present invention correspond to the formula B-(B/A)-A having at least one B block and at least one (B/A) block and at least one A block, wherein:
  (a) each B block is a conjugated diene-rich copolymer block of at least one conjugated diene monomer and at least one monovinyl aromatic monomer, said copolymer block being further characterized in having:
    (i) a controlled vinyl distribution along the polymer chain; and
    (ii) a monovinyl aromatic monomer content of at least 10 percent weight based on the total amount of monovinyl aromatic monomer in the tapered triblock copolymer;
  (b) each (B/A) block is a statistically distributed monovinyl aromatic-rich copolymer block of at least one conjugated diene monomer and at least one monovinyl aromatic monomer, said copolymer block being further characterized in having:
    (i) an adjacent B block and an adjacent A block;
    (ii) a size larger than the one obtained under conventional alkyllithium-initiated anionic copolymerization in polar additive-free aliphatic solvent;
    (iii) a number average molecular weight of at least 5 percent based on the total number average molecular weight of the B-(B/A)-A tapered triblock copolymer; and
    (iv) a monovinyl aromatic monomer content of at least 5 percent weight based on the total amount of monovinyl aromatic monomer in the tapered triblock copolymer; and
  (c) each A block is a polymer block of at least one monovinyl aromatic monomer.

The novel tapered triblock copolymers according to the present invention are characterized by:
  (a) number average molecular weight (Mn) from about 20,000 to about 350,000 g/mol.
  (b) the total amount of monovinyl aromatic monomer in the tapered triblock copolymer is from about 10 percent weight to about 85 percent weight; and
  (c) the total vinyl configuration content is from about 10 percent weight to about 90 percent weight based on the total amount of conjugated diene in the tapered triblock copolymer.

Another aspect of the invention provides a method for preparing tapered triblock copolymers, which includes the step of reacting at least one conjugated diene monomer and at least one monovinyl aromatic monomer under anionic polymerization conditions in the presence of a suitable polar additive or combination of polar additives, corresponding to the formula B-(B/A)-A having at least one B block and at least one (B/A) block and at least one A block, wherein:
  (a) each B block is a conjugated diene-rich copolymer block of at least one conjugated diene monomer and at least one monovinyl aromatic monomer, said copolymer block being further characterized in having:
    (i) a controlled vinyl distribution along the polymer chain; and
    (ii) a monovinyl aromatic monomer content of at least 10 percent weight based on the total amount of monovinyl aromatic monomer in the tapered triblock copolymer;
  (b) each (B/A) block is a statistically distributed monovinyl aromatic-rich copolymer block of at least one conjugated diene monomer and at least one monovinyl aromatic monomer, said copolymer block being further characterized in having:
    (i) an adjacent B block and an adjacent A block;
    (ii) a size larger than the one obtained under conventional alkyllithium-initiated anionic copolymerization in polar additive-free aliphatic solvent;
    (iii) a number average molecular weight of at least 5 percent based on the total number average molecular weight of the B-(B/A)-A tapered triblock copolymer; and
    (iv) a monovinyl aromatic monomer content of at least 5 percent weight based on the total amount of monovinyl aromatic monomer in the tapered triblock copolymer; and
  (c) each A block is a polymer block of at least one monovinyl aromatic monomer.

Other aspects of the invention provide compositions and articles made from the novel tapered triblock copolymers, reinforced materials made from a mixture of the novel tapered triblock copolymer with a material to be reinforced and articles made from the reinforced materials. Other aspects of the invention provide novel tapered triblock copolymers, and their blends with other block copolymers, with enhanced adhesion to specific substrates and articles made from the adhesion enhanced materials.

By controlling the monomers addition order, polymerization sequence, feed rate, and feed composition; the polar additives combination, type, concentration, addition order and feed rate; the polymerization temperature behavior and conditions; and the relative block sizes and molecular weights, the design of the novel tapered triblock copolymers can be tailored to include the characteristics and features according to the present invention, i.e., controlled vinyl distribution (1,2-diene microstructure configuration); enlarged middle block with intermediate composition and microstructure; increased compatibility between its adjacent blocks; and maximized processing characteristics. These design characteristics are suitable qualities to achieve the desired application overall performance in blends with a wide variety of materials and other substrates, including asphalt, adhesive and sealant ingredients, rubber and plastic. The desired application overall performance is a balance between maximized processing characteristics such as melt viscosity, dispersibility, compatibility, miscibility and/or adhesion characteristics, and good elastomeric and thermoplastic properties. Particular applications for which the tapered triblock copolymers of the present invention are well suited include asphalt reinforcers, modifiers and morphology stabilizers. Other suitable applications include use as compatibilizers, viscosity modifiers, flow modifiers, process aids, rheology control agents, and impact modifiers for plastics and plastics blends and alloys, and composites. The tapered triblock copolymers may also be designed with tailored characteristics to provide highly processable adhesives with optimal adhesion to polar substrates, useful in typical adhesive and sealant applications.

DETAILED DESCRIPTION OF THE PREFERRED EMBODIMENTS

The present invention provides tapered triblock copolymers, methods for producing the polymers, compositions and articles made from the polymers, reinforced materials containing the polymers and articles made from the reinforced materials.

The tapered triblock copolymers of the present invention are made by reacting conjugated diene monomers and monovinyl aromatic monomers in such a way as to produce tapered triblock copolymers having tailored chemical and physical properties that make them suitable for use in a broad range of commercial applications. The novel tapered triblock copolymers are characterized in having controlled vinyl distribution (1,2-diene microstructure), enlarged middle block with intermediate composition and microstructure, increased compatibility between its adjacent blocks and maximized processing characteristics.

The novel tapered triblock copolymers according to the present invention correspond to the formula B-[B/A]-A having at least one B block and at least one [B/A] block and at least one A block, wherein:
  (a) each B block is a conjugated diene-rich copolymer block of at least one conjugated diene monomer and at least one monovinyl aromatic monomer, said copolymer block being further characterized in having:
    (i) a controlled vinyl distribution along the polymer chain; and
    (ii) a monovinyl aromatic monomer content of at least 10 percent weight based on the total amount of monovinyl aromatic monomer in the tapered triblock copolymer;
  (b) each [B/A] block is a statistically distributed monovinyl aromatic-rich copolymer block of at least one conjugated diene monomer and at least one monovinyl aromatic monomer, said copolymer block being further characterized in having:
    (i) an adjacent B block and an adjacent A block;
    (ii) a size larger than the one obtained under conventional alkyllithium-initiated anionic copolymerization in polar additive-free aliphatic solvent;
    (iii) a number average molecular weight of at least 5 percent based on the total number average molecular weight of the B-[B/A]-A tapered triblock copolymer; and
    (iv) a monovinyl aromatic monomer content of at least 5 percent weight based on the total amount of monovinyl aromatic monomer in the tapered triblock copolymer; and
  (c) each A block is a polymer block of at least one monovinyl aromatic monomer.

The novel tapered triblock copolymers according to the present invention are characterized by:
  (a) number average molecular weight (Mn) from about 20,000 to about 350,000 g/mol.
  (b) the total amount of monovinyl aromatic monomer in the tapered triblock copolymer is from about 10 percent weight to about 85 percent weight; and
  (c) the total vinyl configuration content is from about 10 percent weight to about 90 percent weight based on the total amount of conjugated diene in the tapered triblock copolymer.

Among the desired commercial applications, some of the novel tapered triblock copolymers provided herein are well suited for use as adhesives and sealants, including pressure sensitive adhesives, non-pressure sensitive adhesives, hot melt adhesives, hot melt and solvent-based mastics and sealants. The tapered triblock copolymers may also be designed for use as compatibilizing or reinforcing agents in asphalt and in polymer blends. Asphalts which may benefit from the compatibilizing or reinforcing agents provided herein include those commonly used for road paving, roofing and sealant applications. Paving applications include reinforcement of asphalt cements/binders used for making asphalt concrete for road construction, as well as modification of materials for road rehabilitation, repair and maintenance, including chip sealing, resealing, resurface and recycling. Roofing applications include reinforcement of roof shingles, as well as modification of materials for roof waterproofing, repair and maintenance. Certain types of tapered triblock copolymers may also be used as reinforcing agents, viscosity modifiers, flow modifiers, processing aids and impact modifiers in rubbers and plastics. Polar plastics, polar engineering plastics and non-polar plastics are types of plastic that may benefit from the tapered triblock copolymers. Polar plastics include, but are not limited to polyamides, polyurethanes, polyethers, polysulfones, polyether-ketones, polyetherether ketones, polyimides, polyetherimides polycarbonates, polyesters and copolymers thereof. Non-polar plastics include, but are not limited to polyolefins, polystyrene and copolymers thereof.

Polymers prepared by anionic polymerization include thermoplastic, elastomeric, and thermoplastic-elastomeric polymers. The polymers may be homopolymers or copolymers, including tapered, random and block copolymers. Among the block copolymers prepared by anionic polymerization, tapered diblock copolymers of conjugated diene and monovinyl aromatic monomers have been of long-lasting commercial importance due to its performance in many applications and its unique properties. Special processing characteristics such as high extrudability and excellent flow combined with mechanical properties such as high hardness, low shrinkage and high abrasion resistance, have been a desirable polymer properties balance for many high-productivity applications.

Alkyllithium-initiated copolymerization of conjugated diene and monovinyl aromatic monomers in hydrocarbon solvents, in the absence of polar additives, yields an interesting type of structure with compositional heterogeneity along the copolymer chain, which is commonly known as tapered, gradual or gradient diblock copolymer structure. Relatively large differences between monomer reactivity ratios (i.e., $r_1>10$ and $r_2<0.1$) are observed despite the similar stabilities of the carbanionic chain ends corresponding to the conjugated diene (1) and monovinyl aromatic (2) monomers. Contrary to the observed faster homopolymerization of monovinyl aromatic monomers relative to conjugated diene monomers, in the initial stage of copolymerization the less reactive conjugated diene monomer is preferentially incorporated into the copolymer chain until it is nearly exhausted, forming a diene-rich, tapered block B with gradual change in composition, and then in the final stage most of the monovinyl aromatic monomer forms a terminal polystyrene block A. B-(B/A)-A Furthermore, during copolymerization in hydrocarbon solvents and in the absence of polar additives, a distinct intermediate stage occurs that forms a small, sharp and steep interphase -(B/A)- with sudden change in composition, which acts as a transition within the copolymer chain between two large A and B blocks. Lower melt viscosities of tapered diblock copolymers relative to pure diblock copolymers, with the same composition and molecular weight, are ascribed to the presence of this small interphase, which weakens the intrachain and interchain repulsion and enhances mixing between dissimilar adjacent blocks. Since alkyllithium-initiated copolymerization of conjugated diene and monovinyl aromatic monomers under the above conditions behaves statistically with a tendency toward random placement of the monomeric units (i.e., $r_1 r_2 \sim 0.5$) mainly due to the large difference in monomer reactivity ratios, both the block B and the interphase -(B/A)- have a compositional drift along the copolymer chain that is directly dependent on the instantaneous relative monomer concentration. Therefore, the initial relatively small concentration of monovinyl aromatic monomer is incorporated into the diene-rich, tapered block B almost randomly and predominantly as isolated aromatic units. On the contrary, the intermediate relatively large concentration of monovinyl aromatic monomer is incorporated into the small, sharp and steep interphase -(B/A)- statistically and predominantly as long aromatic sequences that should rapidly become aromatic-rich segments with residual isolated diene units.

Copolymerization of conjugated diene and monovinyl aromatic monomers with alkyllithium in the absence of polar additives typically results in tapered diblock copolymers with low vinyl configuration content (1,2-diene microstructure). Polar additives simultaneously act as randomizing agents and microstructure modifiers during the copolymerization of conjugated diene and monovinyl aromatic monomers with alkyllithium initiators. The relatively large differences between monomer reactivity ratios decrease with increasing polar additive concentration, which gradually changes the copolymerization behavior from statistical to random, and transform the monomer sequence length distribution from tapered diblock to random diblock and then to a completely random copolymer structure. This randomization effect is typically accompanied by a corresponding modification effect that increases the vinyl configuration content. Although both effects are directly dependent on polar additive concentration, and moreover the modification effect is inversely dependent on polymerization temperature, the extent and specific behavior of each effect is particularly dependent on polar additive type and specific properties. It is possible to combine polar additives to overcome some handicaps and obtain synergistic or desired differentiated effects on monomer sequence length distribution and/or 1,2-diene microstructure.

By controlling the monomer addition order, polymerization sequence, feed rate, and feed composition; the polar additives combination, type, concentration, addition order and feed rate; the polymerization temperature behavior and conditions; and the relative block sizes and molecular weights, the design of the novel tapered triblock copolymers can be tailored to include the characteristics and features according to the present invention, i.e., controlled vinyl distribution (1,2-diene microstructure configuration); enlarged middle block with intermediate composition and microstructure; increased compatibility between its adjacent blocks; and maximized processing characteristics. These design characteristics are suitable qualities to achieve the desired application overall performance in blends with a wide variety of materials and other substrates, including asphalt, adhesive and sealant ingredients, rubber and plastic. The desired application overall performance is a balance between maximized processing characteristics such as melt viscosity, dispersibility, compatibility, miscibility and/or adhesion characteristics, and good elastomeric and thermoplastic properties. Particular applications for which the tapered triblock copolymers of the present invention are well suited include asphalt reinforcers, modifiers and morphology stabilizers. Other suitable applications include use as compatibilizers, viscosity modifiers, flow modifiers, process aids, rheology control agents, and impact modifiers for plastics and plastics blends and alloys, and composites. The tapered triblock copolymers may also be designed with tailored characteristics to provide highly processable adhesives with optimal adhesion to polar substrates, useful in typical adhesive and sealant applications.

The present invention also provides a method for preparing the novel tapered triblock copolymers, which includes the step of reacting at least one conjugated diene monomer and at least one monovinyl aromatic monomer under anionic polymerization conditions in the presence of a suitable polar additive or combination of polar additives, corresponding to the formula B-[B/A]-A having at least one B block and at least one [B/A] block and at least one A block.

B-[B/A]-A

In a typical anionic copolymerization, it is not feasible to independently manipulate the characteristics of the interphase -(B/A)- without affecting the desired characteristics of the adjacent A and B blocks. Therefore, in a preferred embodiment of the present invention, the novel tapered triblock copolymers are sequentially polymerized to independently manipulate the size, composition and microstructure of the desired enlarged middle block -[B/A]-, including the control of its monomer sequence length distribution. The sequential polymerization also makes possible to tailor the relative sizes, composition and microstructure of the adjacent A and B blocks, including the control of the vinyl distribution (1,2-diene microstructure configuration) along the chain of the conjugated diene-rich copolymer block B. The sequential block copolymerization of the novel tapered triblock copolymers of the present invention may begin either with the A block or the B block.

In an embodiment of the present invention, each B block is a conjugated diene-rich copolymer block of at least one conjugated diene monomer and at least one monovinyl aromatic monomer. The diene-rich block B is polymerized in the presence of a suitable amount of either a polar additive or combination of polar additives. The diene-rich block B is a completely random copolymer structure with uniform composition and a controlled vinyl distribution along the copolymer chain. The uniform composition of the diene-rich block B is characterized in having a monovinyl aromatic monomer content of at least 10 percent weight based on the total amount of monovinyl aromatic monomer in the tapered triblock copolymer. The controlled vinyl distribution is manipulated by controlling the temperature profile of polymerization. This polymerization step is allowed to proceed in either isothermal mode for a pre-established residence time or quasi-adiabatic mode up to a peak temperature. The isothermal mode may be used to manipulate a vinyl distribution that is uniform along the copolymer chain and to achieve a vinyl content that is maximized with respect to the added amount of polar additive and the temperature set for the polymerization mixture. The quasi-adiabatic mode may be used to manipulate a vinyl distribution gradient along the copolymer chain. The vinyl distribution gradient not only depends on the controlled temperature profile but also on the initial and final temperature of the polymerization mixture. The diene-rich block copolymer B is manipulated to tailor a uniform composition and a controlled vinyl distribution that contributes to maximize processing characteristics by increasing flow and reducing melt viscosity, and to optimize compatibility with materials, ingredients and/or substrates used in the desired applications.

In another embodiment of the present invention, each -[B/A]- block is a statistically distributed monovinyl aromatic-rich copolymer block of at least one conjugated diene monomer and at least one monovinyl aromatic monomer, where statistically distributed means the sequential distribution of the monomeric units obeys known statistical laws. The enlarged middle block -[B/A]- with intermediate composition and microstructure is either a tapered copolymer structure with gradual change in composition or a completely random copolymer structure with uniform composition, which mainly depends on the amount of the suitable polar additive added to the polymerization mixture. Alternatively or concomitantly, the tapered midblock may be prepared by adding the conjugated diene monomer at a controlled feed rate to the polymerization mixture while the monovinyl aromatic monomer is being polymerized. This polymerization step is allowed to proceed in either isothermal mode for a pre-established residence time or quasi-adiabatic mode up to a peak temperature. The middle block -[B/A]- is enlarged with respect to the small interphase -(B/A)- typical of copolymerization in the absence of polar additives. The enlarged middle block -[B/A]- is manipulated to tailor its relative size with respect to the adjacent A and B blocks to contribute in minimizing repulsion, maximizing the compatibility and promoting interfacial mixing. Each -[B/A]- midblock is characterized in having a number average molecular weight of at least 5 percent based on the total number average molecular weight of the B-[B/A]-A tapered triblock copolymer. The enlarged middle block -[B/A]- is manipulated to become an aromatic-rich block of intermediate composition and microstructure relative to the adjacent A and B blocks, for not only contributing to improve interfacial mixing but also to improve fracture strength. Each -[B/A]- midblock is characterized in having a monovinyl aromatic monomer content of at least 5 percent weight based on the total amount of monovinyl aromatic monomer in the tapered triblock copolymer. An optimum middle block -[B/A]- is the one that provides the best balance between processing characteristics and application performance properties. People skilled in the art understand the differences in characteristics, properties and applicability that these different kinds of novel tapered triblock copolymers have.

In an additional embodiment of the present invention, each A block is a polymer block of at least one monovinyl aromatic monomer. Each A block is manipulated to tailor its relative size with respect to -[B/A]- midblock and B block to contribute in achieving the application performance properties.

The novel tapered triblock copolymers for use in the present invention typically have a number average molecular weight from about 20,000 to about 350,000 g/mol. This includes tapered triblock copolymers having preferably a number average molecular weight from about 50,000 to 300,000 g/mol and more preferably a number average molecular weight from about 50,000 to 250,000 g/mol. Throughout this disclosure, the molecular weights cited are measured using gel permeation chromatography under ASTM D 3536 with linear polystyrene standards. The composition of vinyl aromatic monomer in the total tapered triblock copolymer preferably ranges from about 10 to about 85 percent weight, more preferably from about 15 to about 70 percent weight, and even more preferably from about 20 to about 60 percent weight. The vinyl configuration content of the novel tapered triblock copolymers, based on the total amount of conjugated diene monomer in the tapered triblock copolymer, may range preferably from about 10 to about 90 percent weight, more preferably from about 15 to about 75 percent weight, and even more preferably from about 20 to 60 percent weight. The invention is not limited to tapered triblock copolymers falling within the preferred molecular weight, composition and vinyl configuration ranges.

Examples of tapered triblock copolymers that may be made from anionically polymerizable monomers include, but are not limited to, elastomers and thermoplastic elastomers made from block copolymers of styrene (S), butadiene (B), and/or isoprene (I) of varying sizes and number of blocks. Examples of such elastomers and thermoplastic elastomers include (S/B-rich)-(B/S-rich)-S, (S/I-rich)-(I/S-rich)-S, (S/B)-S, (S/I)-S, (S/B)m-S and (S/I)m-S (where m is an integer), S-(S/B-rich)-(B/S-rich)-S, S-(S/I-rich)-(I/S-rich)-S, S-(B/S-rich)-(S/B-rich)-(B/S-rich)-S, S-(I/S-rich)-(S/I-rich)-(I/S-rich)-S, [S-(B/S-rich)-(S/B-rich)]n-X, [S-(I/S-rich)-(S/I-rich)]n-X, X-[S-(B/S-rich)-(S/B-rich)]n, X-[S-(I/S-rich)-(S/I-rich)]n (where X is the residue of either a coupling agent or a multifunctional initiator and n is an integer from 2 to about 30) tapered triblock copolymers as well as their hydrogenated, selectively hydrogenated, and partially hydrogenated counterparts.

The novel tapered triblock copolymers may be polymer blends obtained by partial coupling and/or by partial initiation, or branched and radial polymers obtained by total coupling and/or total initiation with a multifunctional initiator. Blends of tapered triblock copolymers may be prepared in situ by adding a suitable amount of a coupling agent at the end of polymerization of the tapered triblock copolymers of the present invention B-[B/A]-A. The partial coupling is achieved by controlling the stoichiometric ratio of coupling agent to living polymer. Blends of tapered triblock copolymers may also be prepared in situ by using a suitable multifunctional initiator combined with the typical monofunctional initiator, such as an alkyllithium, to initiate the polymerization of the tapered triblock copolymers of the present invention B-[B/A]-A. The partial initiation is achieved by controlling the stoichiometric ratio of multifunctional initiator to monofunctional initiator. The novel tapered triblock copolymers for use in the present invention may have from 2 to 30 anionically polymerized polymers chains per initiator or coupling agent molecule. These branched and radial tapered triblock copolymers may have a number average molecular weight from about 30,000 to about 1,000,000 g/mol. This includes tapered triblock copolymers having preferably a number average molecular weight from about 50,000 to 600,000 g/mol. In some embodiments of the novel tapered triblock copolymers, the composition of vinyl aromatic monomer preferably ranges from about 10 to about 85 percent weight, more preferably from about 15 to about 70 percent weight, and even more preferably from about 20 to 60 percent weight. The vinyl configuration content of the novel tapered triblock copolymers, based on the total amount of conjugated diene monomer in the tapered triblock copolymer, may range preferably from about 10 to about 90 percent weight, more preferably from about 15 to about 75 percent weight, and even more preferably from about 20 to 60 percent weight. The invention is not limited to tapered triblock copolymers falling within the preferred molecular weight, composition and vinyl configuration ranges.

The anionically polymerized polymers can be made by any suitable method known in the art, such as those described in U.S. Pat. Nos. 3,281,383, and 3,753,936, which are incorporated herein in their entirety by reference. In these methods the anionically polymerized polymers are made by contacting anionically polymerizable monomers with an organolithium compound as an initiator. The preferred class of these compounds can be represented by the formula RLi wherein R is a hydrocarbon radical selected from the group consisting of aliphatic, cycloaliphatic, and aromatic radicals containing from 1 to 20 carbon atoms, although higher molecular weight initiators can be used. Many anionic polymerization initiators are well known and commercially available. Monofunctional organolithium compounds, such as butyllithium, are examples of commonly used initiators. Specific examples of these initiators include methyllithium, ethyllithium, tert-butyllithium, sec-butyllithium, n-butyllithium, n-decyllithium, isopropyllithium, eicosyllithium, cycloalkyllithium compounds, such as cyclohexyllithium, and aryllithium compounds, such as phenyllithium, naphthllithium, p-toluoyllithium, 1,1-diphenylhexyllithium, and the like. Monofunctional organolithium compounds substituted with protected polar functional groups may also be used as initiators for anionic polymerization.

The amount of initiator varies depending upon the desired molecular weight of the anionically polymerized polymer. Number average molecular weights between about 20,000 and 350,000 can be obtained by adding about 0.28 to 5.0 millimoles of the RLi initiator per mole of monomers corrected by the factor 100/(MW of monomer).

Multifunctional organolithium initiators may also be used as initiators to prepare branched and radial tapered triblock copolymers with a desired functionality range of 2 to about 30 anionically polymerized polymers chains per initiator molecule. Multifunctional organolithium initiators are readily prepared by direct addition reaction of a stoichiometric amount of a monofunctional organolithium compound to a polyvinyl compound such as 1,3-diisopropenyl benzene, 1,3,5-triisopropenyl benzene, 1,3-bis(1-phenylethenyl)benzene, 1,3,5-tris(1-phenylethenyl)benzene, 1,3-divinylbenzene, 1,3,5-trivinylbenzene, and the like. Oligomeric polyvinyl compounds may be used to prepare multifunctional organolithium initiators with high functionality. Monofunctional organolithium compounds, such as butyllithium, are examples of commonly used initiators for the above addition reaction. Specific examples of these commonly used initiators include tert-butyllithium, sec-butyllithium, and n-butyllithium. Monofunctional organolithium compounds substituted with protected polar functional groups may also be used to prepare multifunctional organolithium initiators. Multifunctional organolithium compounds may be combined among them and/or with monofunctional organolithium compounds to partially initiate anionic polymerization with the multifunctional organolithium compound. The partial initiation is achieved by controlling the stoichiometric ratio of multifunctional initiator to monofunctional initiator.

Anionic polymerization is typically carried out in inert hydrocarbon solvents at relatively low temperatures under vacuum or an inert atmosphere with highly purified reagents in order to prevent the premature termination of the polymerization reaction. The anionic polymerization reactions may take place in a variety of organic solvents. Examples of suitable solvents include, but are not limited to, pentane, hexane, heptane, octane, cyclopentane, cyclohexane, cycloheptane, benzene, naphthalene, toluene, xylene, methyl ether, methyl ethyl ether, diethyl ether, tetrahydrofuran, acetone, methyl ethyl ketone, and mixtures thereof. Cyclohexane in particular, is well suited for use as the solvent in anionic polymerizations.

The anionic polymerization is normally carried out at temperatures in the range from −100° C. to 150° C., preferably between −75° C. and 75° C. Normally 50 to 90% by weight of a reaction solvent is used to control the viscosity inside the reaction zone, preferably 70 to 85%. Typical residence times for anionic polymerization vary depending on the reaction temperature and initiator level between 0.1 and 5 hours, preferable from 0.2 to 2 hours.

Polar additives that are known in the art and may be used to prepare the tapered triblock copolymers of the present invention are Lewis bases such as ethers and tertiary amines, and Group Ia alkali metal alkoxides and combinations thereof. Specific examples of these suitable ether polar additives include monofunctional, multifunctional and oligomeric alkyl and cyclic ethers such as dimethyl ether, diethyl ether, ethyl methyl ether, ethyl propyl ether, di-n-propyl ether, tetramethylene oxide (tetrahydrofuran), 1,2-dimethoxyethane, bis-tetrahydrofuran, combinations thereof and the like. Specific examples of these suitable tertiary amine polar additives include monofunctional, multifunctional and oligomeric alkyl and cyclic tertiary amines such as dimethylethyl amine, trimethyl amine, triethyl amine, N,N,N',N'-tetramethyl ethylene diamine (TMEDA), N,N,N',N',N''-pentamethyl diethyl triamine, combinations thereof, and the like. Specific examples of these suitable Group Ia alkali metal alkoxides (lithium, sodium, potassium, rubidium and cesium salts) include monofunctional, multifunctional and oligomeric alkyl and cyclic metal alkoxides such as sodium tert-butoxide, sodium tert-amylate, sodium mentholate, potassium tert-butoxide, potassium tert-amylate, potassium mentholate, combinations thereof, and the like.

The amount of the suitable polar additive is in the range of 0.0005 to 50 weight percentage of the total reaction mixture and is preferably in the range of 0.0005 to 5.0 weight percentage of the total reaction mixture. A more preferred range is about 0.0005 to about 2.0 wt % of total reaction mixture for each component. A most preferred combination is one that combines one Lewis base (TMEDA or THF) with one alkali metal alkoxide (e.g., sodium, potassium) for high vinyl first block and random middle block. A more preferred combination is one that combines two Lewis bases (i.e. one ether and one tertiary amine) for medium vinyl with better randomization of first block. A preferred combination is one that combines two alkali metal alkoxides (e.g., lithium and sodium, lithium and potassium) for low vinyl with excellent randomization of first block. Preferred concentrations of polar additive or combination of polar additives depend on the type of polar additive or additives, and the desired monomer sequence length distribution, microstructure and properties of the tapered triblock copolymer. The desired properties will, in turn, depend on the intended application of the tapered triblock copolymer.

Suitable conjugated dienes for use in building the tapered triblock copolymers of the present invention include, but are not limited to, 1,3 butadiene, isoprene, 1,3-pentadiene, methylpentadiene, phenylbutadiene, 2,3-dimethyl-1,3-butadiene, 2,4-hexadiene, 1,3-hexadiene, 1,3-cyclohexadiene, 3,4-dimethyl-1,3-hexadiene, 1,3-octadiene, 4,5-diethyl-1,3-octadiene and combinations thereof.

Suitable monovinyl aromatic monomers for use in building the novel tapered triblock copolymers of the present invention include, but are not limited to, styrene and styrene derivatives such as 3-methylstyrene, α-methyl styrene, p-methyl styrene, α,4-dimethylstyrene, t-butyl styrene, o-chlorostyrene, 2-butenyl naphthalene, 4-t-butoxystyrene, 3-isopropenyl biphenyl, 4-vinylpyridine, 2-vinylpyridine and isopropenyl naphthalene, 4-n-propylstyrene, and combinations thereof.

In some embodiments of the methods provided here, the novel tapered triblock copolymers undergo total or partial coupling to prepare branched and radial tapered triblock copolymers. Partial coupling means that a portion of the total living anionically polymerized polymer chain-ends undergo coupling with coupling agents. The coupling agents desirably couple between 2 and 30 anionically polymerized polymer chains, although coupling agents capable of coupling a greater number of chains may also be employed. Suitable coupling agents for use in the total or partial coupling step include, but are not limited to, tin halides, silicon halides, functionalized tin compounds, functionalized silicon compound such as a silane compound and functionalized oligomeric compounds such as the ones listed in U.S. Pat. No. 7,517,934. The entire disclosure of U.S. Pat. No. 7,517,934 is incorporated herein by reference. Silicon tetrachloride and tin tetrachloride are specific examples of suitable coupling agents, with silicon tetrachloride being particularly well-suited for this application. The partial coupling is achieved by controlling the stoichiometric ratio of coupling agent to living polymer. The partial coupling may provide a polymer blend with desired properties.

Organometallic compounds of different metals from Groups IIa, IIb and IIIa, including magnesium, zinc and aluminum, may be used as polymerization rate modifiers when mixed with alkyllithium initiators. Specific examples of suitable polymerization rate modifiers are dibutyl magnesium, diethyl zinc, triethyl aluminium and combinations thereof. The polymerization rate modifiers may be used to control the temperature profile of polymerization. The polymerization rate modifiers contribute to control a polymerization step in either isothermal mode for a pre-established residence time or quasi-adiabatic mode up to a peak temperature.

In some embodiments of the methods provided here, the novel tapered triblock copolymers are polymerized in batch, programmed-batch and/or semi-batch processes. The method to prepare the novel tapered triblock copolymers may be of one, two or three polymerization stages.

The one-stage method can be carried out by alkyllithium copolymerization of conjugated diene and monovinyl aromatic monomers, which is a method with very low flexibility to manipulate the characteristics of the different blocks of the tapered triblock copolymer. In particular, with the one-stage method it is not feasible to widely control the block sizes and microstructures of the tapered triblock copolymers, and therefore, it is not possible to achieve the desired balance between processing characteristics and performance properties.

The two-stage method can be carried out by programmed batch, semi batch or sequential additions of monomers. The novel tapered triblock copolymers can be obtained by first polymerizing the monovinyl aromatic monomer, and second adding the conjugated diene monomer to the reaction zone prior to the full consumption of the monovinyl aromatic monomer. In this manner an enlarged middle block copolymer is formed between the monovinyl aromatic and conjugated diene monomer blocks. It is also possible to first polymerize an initial amount of conjugated diene and monovinyl aromatic monomers, and second, slowly adding an additional amount of conjugated diene monomer to the reaction zone prior to the full consumption of the initial monomer addition to broaden the middle block copolymer between the monovinyl aromatic and conjugated diene monomer blocks. The novel tapered triblock copolymers can also be obtained by first copolymerizing an initial addition of monovinyl aromatic and conjugated diene monomers to form a conjugated diene-rich block followed by an enlarged tapered middle block copolymer, and second adding an additional amount of monovinyl aromatic monomer to the reaction zone after the full consumption of the initial monomer addition to form the terminal monovinyl aromatic block. It is also possible to first copolymerize an initial amount of conjugated diene and monovinyl aromatic monomers to form a conjugated diene-rich block, and second, add an additional amount of conjugated diene and monovinyl aromatic monomers to the reaction zone after the full consumption to form an enlarged middle block copolymer followed by the terminal monovinyl aromatic block. It is also possible to first polymerize the monovinyl aromatic monomer until full consumption and then add monovinyl aromatic monomer followed by a slow addition of the conjugated diene monomer.

The three-stage method can be carried out by programmed batch, semi-batch or sequential addition of monomers. The novel tapered triblock copolymers can be obtained by first polymerizing an initial amount of monovinyl aromatic monomer to form the monovinyl aromatic block, second simultaneously adding an amount of conjugated diene and monovinyl aromatic monomers to the reaction zone after the full consumption of the initial monovinyl aromatic monomer to form an enlarged middle block aromatic-rich copolymer, and third adding conjugated diene and monovinyl aromatic monomers to form a conjugated diene-rich block. It is also possible to first polymerize an initial amount of conjugated diene and monovinyl aromatic monomers to form the conjugated diene-rich block, second simultaneously add an additional amount of conjugated diene and monovinyl aromatic monomers to the reaction zone after the full consumption of the initial addition to broaden the middle block aromatic-rich copolymer and third adding monovinyl aromatic monomer to form the terminal monovinyl aromatic block. The novel tapered triblock copolymers can also be obtained by first polymerizing an initial amount of monovinyl aromatic monomer to form the monovinyl aromatic block, second simultaneously adding an amount of monovinyl aromatic monomer and a slow addition of conjugated diene monomer to the reaction zone to form an enlarged middle block aromatic-rich copolymer, and third adding conjugated diene and monovinyl aromatic monomers to form a conjugated diene-rich block. It is also possible to first polymerize an initial amount of conjugated diene and monovinyl aromatic monomers to form the conjugated diene-rich block, second simultaneously add an additional amount of monovinyl aromatic monomer and a slow addition of conjugated diene monomer to the reaction zone to broaden the middle block aromatic-rich copolymer and third add monovinyl aromatic monomer to form the terminal monovinyl aromatic block.

In additional embodiments of the methods of the present invention, the tapered triblock copolymers may be prepared in continuous and/or semi-continuous mode. The anionic polymerization of the tapered triblock copolymers may take place in situ i.e., in a single reaction zone, or may take place in multiple reaction zones. The single-zone design tends to favor faster reactions while the multiple-zone design may be preferred when specially controlled polymerization reactions are desired. In some embodiments, a reaction apparatus having two or more reaction zones (e.g., reaction chambers) may be employed. In these embodiments, the anionic polymerization to form the first block of the novel tapered triblock copolymers may be carried out in a first reaction zone, the polymerization of the middle block in a second reaction zone, and the reaction of the terminal block may be carried out in a third reaction zone.

As one of skill in the art would recognize, the described synthesis of the tapered triblock copolymers can occur in a reaction setting comprising either a batch, a semi-continuous or a continuous process operated at temperatures, solvent ratios and stream flow rates necessary to reach the described residence time and stoichiometry conditions.

Applications

As one of skill in the art would recognize, the optimal characteristics and properties of the tapered triblock copolymers will depend on the intended application. Several exemplary applications for the tapered triblock copolymers are provided below. These applications are provided only for illustrative purposes and are not intended to limit the scope of the invention.

Asphalt Reinforcement:

Asphalt modification with high molecular weight elastomers is typically used to prepare modified asphalt binders with improved performance over unmodified asphalt binders. Performance properties of asphaltic products that are improved with the addition of polymers are: a) flexibility at low temperatures; b) resistance to flow and deformation at high temperatures; c) temperature susceptibility; d) tensile strength; e) stiffness modulus at high temperatures; f) asphalt-aggregate adhesion; g) resistance to surface abrasion. Asphaltic products that benefit from modification with polymers are pavement binders, seal coats, highway joint sealants, waterproofing membranes, coatings, pipeline mastics, pipeline wrapping tapes, and others.

Since high molecular weight polymers have the tendency to be immiscible with asphalt, asphalt modification with elastomers based on monovinyl aromatic and conjugated diene monomers is complicated by limited phase stability, which results in asphalt-polymer separation that negatively affects the performance properties of the asphaltic products. Phase stability has been typically improved by either crosslinking the asphalt-polymer blend or by increasing the compatibility of the polymer with asphalt. High molecular weight polymers also adversely affect the processing characteristics of the modified asphalt binders by significantly increasing the melt viscosity of the asphalt-polymer blends. Modification of polymer composition and/or structure in prior art has been used to improve processing characteristics and reduce the cost of asphalt-polymer blends, but often performance properties are unfavorably modified.

The inventors have discovered that the addition of the tapered triblock copolymer compositions provided herein into asphalt maximizes the processing characteristics, without diminishing the performance properties of the modified asphalt, when compared to modified asphalt formulated with prior art copolymers. The modified tapered block copolymers of the present invention provide the asphalt blends with lower melt viscosity and high flow; increased dispersibility and compatibility; higher blend stability; and good elastomeric and thermoplastic properties. It has also been discovered that the tapered triblock copolymers of the present invention can be used as compatibilizing or reinforcing agents. Asphalts which may benefit from the compatibilizing or reinforcing agents provided herein include those commonly used for road paving, roofing and sealant applications. Paving applications include reinforcement of asphalt cements/binders used for making asphalt concrete for road construction, as well as modification of materials for road rehabilitation, repair and maintenance, including chip sealing, resealing, resurface and recycling. Roofing applications include reinforcement of roof shingles, as well as modification of materials for roof waterproofing, repair and maintenance.

The inventors have also discovered that emulsions of asphalt previously modified with the tapered triblock copolymers of the present invention improve asphalt adherence to aggregate particles when used for road rehabilitation, repair and maintenance. It has also been discovered that the compatibilizing or reinforcing agents provided herein can be encapsulated and blended with commercially available block copolymers to improve phase stability and processing characteristics of the modified asphalt blend.

In countries such as the United States, modified asphalts are evaluated according to the standards of the American Association of State Highway and Transportation Officials (AASHTO), which rates asphalts according to performance grade (PG). The standards of the American Society for Testing and Materials (ASTM) are also used for asphalt evaluation. Among the properties evaluated in modified asphalts are the following:

a) Ring and ball softening point (RBSP), which may be measured in accordance with ASTM D 36, which indicates the temperature at which asphalt softens and becomes unsuitable for the subject application. The softening point or temperature is taken using a Ring and Ball apparatus, also known as an R&B apparatus.

b) Penetration at 25° C., which is a parameter related to the rigidity of the modified asphalt. Penetration may be measured in accordance with ASTM D5 as the distance a weighted needle or cone will sink into the asphalt during a set period of time.

c) Brookfield Viscosity, which is a property relating to the stable stationary flow of asphalt. Brookfield Viscosity may be measured in accordance with ASTM D4402.

d) Resilience is a property that measures the elasticity of an asphalt material. Resilience may be measured in accordance with ASTM D 113.

e) Rutting factor: $G^*/\sin \delta$ at various temperatures (wherein $G^*$ is the complex modulus and $\delta$ is the phase angle) is useful for determining the performance of modified asphalt at high temperatures. This factor indicates how resistant a pavement is to the permanent deformation that can occur over time with repeated loads at high temperature, or when the pavement is subjected to a load much greater than the maximum allowed in the original design. Therefore, higher Rutting factor values at high temperatures indicate that the asphalt can withstand greater deformation than materials that have lower Rutting factors at the same test temperature. The Rutting factor may be measured in accordance with AASHTO TP5.

f) Upper temperature limit. By determining the Rutting factor, it is possible to determine the upper temperature limit in accordance with AASHTO standards. The upper temperature limit relates to the maximum temperature at which the asphalt may retain adequate rigidity to resist rutting.

g) Lower temperature limit. By determining the Rutting factor, it is possible to determine the lower temperature limit in accordance with AASHTO standards. The lower temperature limit relates to the minimum temperature at which the asphalt may retain adequate flexibility to resist thermal cracking.

h) Phase segregation is a critical factor in the modification of asphalt with elastomers, due to the aforementioned problems. The phase separation index is measured as the percent difference between the $T_{RBSP}$ measured at the top and bottom surfaces of a cylindrical probe, made in the interior of a sealed tube containing the formulated asphalt and aged at 163° C. for 48 hours in a vertical position without agitation, and frozen at 30° C. The percentage difference in $T_{RBSP}$ provides a measure of the compatibility between the asphalt-rich phase and the polymer-rich phase in an asphalt/polymer blend.

Two specific applications for which the reinforced asphalts may be used are road paving applications and roofing/waterproof coating applications. In some instances when the reinforced asphalt is used in a road paving application, 1 to 10 parts of the tapered triblock copolymer of the present invention, preferably 2 to 5 parts, may be mixed with 99 to 90 parts, preferably 98 to 95 parts, of an asphalt to improve the performance characteristics thereof. In some instances when the reinforced asphalt is used in a roofing or waterproof coating application, 5 to 20 parts of the tapered triblock copolymer of the present invention, preferably 8 to 16 parts, may be mixed with 95 to 80 parts, preferably 92 to 84 parts, of an asphalt to improve the performance characteristics thereof. Suitable asphalts for use with the tapered triblock copolymers of the present invention include, but are not limited to, AC-20 and Redaspol 90 asphalts or other asphalt widely used in road paving and roofing applications such as native rock asphalts, lake asphalts, petroleum asphalts, air-blown asphalts, cracked asphalts, and residual asphalts.

In certain embodiments of the invention, the much lower viscosity (up to 35%) of the AC-20 asphalt formulations prepared with the tapered triblock copolymers provided herein, besides contributing to improve the dispersion into the asphalt, also facilitates the processing, handling and application of the modified asphalt blends by improving pumping capacity and/or decreasing the energy required to apply it. Furthermore, the asphalts modified with the tapered triblock copolymers of the present invention formulated with different sulfur content, demonstrate an improvement in compatibility by surprisingly decreasing in an amount of 25% the vulcanization agent needed to stabilize the different phases in the blend without diminishing the performance properties. This also means an important cost reduction and a more environmentally-friendly process. The viscosities of the Redaspol 90 asphalt modified with the tapered triblock copolymers of the present invention at different concentrations are slightly higher than those of the respective asphalt modified with a suitable control. Although the viscosities are on the lower end of the viscosity range commonly used in the asphalt industry, the higher viscosities are attributed to the increased compatibility with this particular asphalt, which results in significantly improved $T_{RBSP}$. The much higher softening point temperature of the asphalt modified with the tapered triblock copolymers of the present invention should provide a much better resistance to flow and deformation at high temperatures. Surprisingly, the asphalt modified with the tapered triblock copolymers of the present invention and formulated with lower polymer content (up to 25%), provide similar performance properties ($T_{RBSP}$) and lower viscosity than the asphalt modified with a suitable control. This also means an important cost reduction and an energy-saving process.

In certain embodiments of the invention, the tapered triblock copolymers provided herein may confer asphalt compositions with one or more of the following properties: a) maximum application temperature of about 50 to 100° C., measured as the temperature at which the Rutting Factor or Dynamic Shear Stiffness (G*/sin δ) takes a value of 1.0 KPa (measured as per AASHTO TP5); b) $T_{RBSP}$ (measured as per ASTM D36) of about 40 to 90° C.; c) asphalt penetration at 25° C. (as per ASTM D5) of about 30 to 75 dmm for road paving applications or about 50 to 100 for roofing and waterproof coating applications; d) morphology stability or phase separation index of no more than about 5% and desirably no more than about 2% for road paving applications and no more than about 25% and desirably no more than about 10% for roofing and waterproof coating applications; and e) dynamic viscosity at 135° C. of about 500 to 3000 cP and desirably 1000 to 2000 cP for road paving applications or at 160° C. of about 1000 to 6000 cP and desirably 1500 to 4000 cP (as per ASTM D4402). Compared to the asphalt compositions made with a suitable control, the above referenced properties may represent an improvement of about 5 to 25% in dynamic viscosity for road paving applications or an improvement of about 15 to 35% for roofing and waterproof coating applications.

Adhesives, Sealants and Coatings:

High molecular weight elastomers are typically formulated in blends useful as adhesives, sealants and coatings to provide cohesive strength and adequate balance for each application between adhesive and cohesive properties. Elastomers based on monovinyl aromatic and conjugated diene monomers are extensively used as pressure-sensitive adhesives, spray and contact adhesives, panel and construction mastics, sealants and coatings. Isoprene-containing elastomers are preferred for hot melt pressure sensitive adhesives because they can be readily tackified at low cost. Butadiene-containing elastomers are generally preferred for construction or laminating adhesives because they can provide stiffness and cohesive strength. Hydrogenated versions of these elastomers are preferred for sealants because of their higher weather resistance. Performance properties that are required for successful formulation of adhesives, sealants and coatings products with elastomers are the following: a) tackifying resin compatibility with elastomer; b) continuous elastomer phase morphology for cohesive strength and shear resistance; c) soft and low modulus elastomer for tack development and energy dissipation; d) suitable tackifying resin that raises the glass transition temperature ($T_g$) of rubbery phase of the elastomer for increasing dissipation of strain energy.

High molecular weight polymers of the prior art adversely affect the processing characteristics of the adhesives, sealants and coatings formulations by significantly increasing the melt and solution viscosity of these blends. Modification of polymer composition and/or structure in prior art has been used to improve processing characteristics and to reduce the cost of formulations for adhesives, sealants and coatings applications, but often performance properties are unfavorably modified. Among the desired commercial applications, some of the novel tapered triblock copolymers provided herein are well suited for use as adhesives, sealants and coatings, including pressure sensitive adhesives, non-pressure sensitive adhesives, hot melt adhesives, hot melt and solvent-based mastics, sealants and coatings. The development of low melt viscosity and low solution viscosity is particularly important for pressure-sensitive adhesives, hot melt adhesives and solvent-based adhesives. The inventors have discovered that the addition of the novel tapered triblock copolymers provide outstanding processing characteristics to formulations without significantly affecting the desired performance properties of adhesives, sealants and coatings products. It has also been discovered that the compatibilizing or reinforcing agents provided herein can be encapsulated and blended with commercially available block copolymers to improve phase stability and processing characteristics of the adhesive blends.

In some such applications, about 10 to 40, desirably 15 to 30, and more desirably 18 to 25, parts by weight of the novel tapered triblock copolymers, or its mixtures with commercially available block copolymers, are mixed with other conventional adhesive formulation components/additives, such as tackifying resins; plasticizers; coupling agents; crosslinking agents; photoinitiators; fillers; processing aids; stabilizers and antioxidants to confer such compositions with improved properties compared to adhesives formulated with prior art elastomers as suitable controls. Examples of suitable tackifiers include resins with high and low softening points which are compatible with the polymer. These include hydrogenated resins, rosin esters, polyterpene resins, terpene phenol resins, indene-coumarone resins and aliphatic hydrocarbon resins. In some illustrative embodiments, the amount of tackifying resins in the composition ranges from about 40 to 65% by weight. Plasticizers, generally known as extending oils, include mineral oils, paraffinic oils, and naphthenic oils. In some illustrative embodiments, the amount of plasticizer in the composition ranges from about 15 to 35% by weight. The antioxidants may be used to inhibit the thermal and UV oxidation processes, and are typically added to the adhesive composition in amounts of about 0.05 to 3% by weight. Examples of antioxidants include phenol compounds, phosphites, amines, and thio compounds. Some examples of commercially available adhesive components/additives are listed in Table A below.

TABLE A

Commercially Available Adhesive Components/Additives

RESINS

| Rosin esters: | Styrenated Terpenes: | Polyterpene resins: | Terpene phenolics: |
|---|---|---|---|
| Sylvalite RE100L[a] | Sylvares ZT5100[a] | Sylvares TR1100[a] | Sylvares TP2040[a] |
| Sylvalite RE115[a] | Sylvares ZT105LT[a] | Sylvares TR7115[a] | Sylvares TP115[a] |
| Sylvalite RE85L[a] | Sylvares ZT115LT[a] | | |
| Foral 85[b] | | | |
| Foral 105[b] | | | |
| Pentalyn H[b] | | | |
| Permalyn 3100[b] | | | |

| Aliphatic Hydrocarbon resins: | Hydrogenated Hydrocarbon Resins: |
|---|---|
| Piccotac 1100[b] | Eastotac H100[b] |
| Piccotac 115[b] | Eastotac H130[b] |
| Wingtack 95[a] | |

PLASTICIZERS

| Naphthenic | Paraffinic |
|---|---|
| Shellflex 371[c] | Shellflex 210[c] |
| Shellflex 3271[c] | Shellflex 270[c] |
| RPO-104C[e] | Shellflex 330[c] |
| | Primol 352[d] |
| | RPO-138[e] |
| | P.OIL 50[e] |

ANTIOXIDANTS

| Phenolic | Phosphite | Thio | Blends |
|---|---|---|---|
| Irganox 1010[f] | Alkanox TNPP[g] | Lowinox DSTDP[g] | Ultranox 877A[h] |
| Irganox 1076[f] | Alkanox 240[g] | | |
| Irganox 565[f] | Ultranox 626[h] | | |
| Irganox 1520[f] | Weston 618F[h] | | |
| Irganox 1098[f] | | | |
| Anox 20[g] | | | |
| Ultranox 276[h] | | | |

Available from:
[a]Arizona Chemical;
[b]Eastman/Hercules;
[c]Shell;
[d]Esso, ExxonMobil;
[e]IPISA. Ingenieria y Procesos Industriales, S.A.;
[f]Ciba Specialty Chemicals, Inc.;
[g]Great Lakes Chemical Corporation;
[h]GE Specialty Chemicals.

Compared to the same adhesive compositions formulated with the prior art elastomers as suitable controls, the above processing properties may represent an improvement of about 20 to 60% in Brookfield viscosity at 177° C. and in exceptional cases combined with improvements in performance properties of up to 10% in tensile strength; an improvement of up to 30% in peel strength; and an improvement of up to 75% in shear strength.

The invention will be further described by reference to the following examples which are presented for the purpose of illustration only and are not intended to limit the scope of the invention.

EXAMPLES

Example 1

Preparation of Tapered Triblock Copolymers (TTC)

Eight different tapered triblock copolymers were designed and prepared in 1 to 200 Liter reactor systems operated in batch, semi-continuous or continuous mode according to the teachings of this invention. Immediately before addition to the reactor system, solvent and monomers were thoroughly purified to decrease their moisture content to a maximum of 5 ppm by flowing through a set of columns packed with alumina and molecular sieves. Purified solvent was loaded into the reactor and heated to the initial reaction temperature (Ti). Once Ti was reached, a suitable polar modifier such as tetrahydrofuran or tetramethyl ethylene diamine was added into the reactor followed by the addition of conjugated diene and monovinyl aromatic monomers to form the first block of the tapered triblock copolymer. This reaction mixture was allowed to stabilize at Ti, and then n-butyllithium or another suitable initiator was added in a suitable solvent solution directly into the reactor mixture. The amount of initiator was stoichiometrically calculated to form individual blocks and/or final living tapered triblock copolymer with number average molecular weight about a target value. This polymerization step was then allowed to proceed in either isothermal mode for a pre-established residence time (tr) or quasi-adiabatic mode to a first peak temperature (Tp1). For examples in Table 1, Tp1 was kept below a certain temperature to control the vinyl configuration gradient of the conjugated diene monomer in the first block of the tapered triblock copolymer. During the next polymerization step, simultaneous addition(s) of conjugated diene and monovinyl aromatic monomers were carried out in a programmed batch or semi-batch mode to promote the formation of a statistically distributed tapered copolymer with gradual change in composition along the copolymer chain, or a random copolymer with uniform composition, as the second block of the tapered triblock copolymer. The third block of the tapered triblock copolymer was formed by either sequential addition of a monovinyl aromatic monomer or by adding into the reactor additional monovinyl aromatic monomer during the last programmed addition of the previous polymerization step. At the end of this process, final peak temperature (Tpf), tapered triblock copolymers were obtained.

The specific synthesis conditions and TTC characterization parameters are given in Table 1 below. The abbreviations used below are defined as follows, STY=styrene, BD=1,3-butadiene, n-BuLi=n-butyllithium, CHX=cyclohexane, THF=etrahydrofuran, and TMEDA=N,N,N',N'-tetramethyl ethylene diamine. In Table 1, the first peak temperature refers to the temperature recorded after the first monomer addition and polymerization, and the final peak temperature refers to the temperature after the last monomer addition and polymerization.

TABLE 1

Tapered Triblock Copolymers

| | TTC 1 | TTC 2 | TTC 3 | TTC 4 | TTC 5 | TTC 6 | TTC 7 | TTC 8 |
|---|---|---|---|---|---|---|---|---|
| 1st STY (%)[a] | 5.4 | 7.5 | 8.3 | 9.5 | 10.2 | 6.9 | 7.4 | 6.0 |
| 1st BD (%)[a] | 45.4 | 34.6 | 33.1 | 27.9 | 24.3 | 42.0 | 36.1 | 38.6 |
| TMEDA (%)[b] | 0.0042 | 0.0092 | 0.0084 | 0.0150 | 0.0126 | 0.0168 | 0.0042 | 0.0153 |
| 2nd STY (%)[a] | 10.7 | 16.9 | 18.3 | 21.9 | 24.6 | 12.5 | 13.9 | 12.0 |
| 2nd BD (%)[a] | 20.7 | 20.5 | 22.2 | 19.7 | 20.8 | 19.5 | 14.6 | 12.6 |
| 3rd STY (%)[a] | 17.7 | 20.6 | 17.9 | 21.2 | 20.0 | 19.2 | 28.1 | 30.7 |
| CHX (%)[b] | 83.3 | 83.3 | 83.3 | 83.3 | 83.3 | 83.3 | 83.3 | 83.3 |
| Reactor Volume (Liter) | 5.3 | 5.3 | 5.3 | 5.3 | 5.3 | 180.0 | 5.3 | 5.3 |
| Initial Reaction Temperature (Ti) (° C.) | 51 | 52 | 50 | 53 | 52 | 52 | 50 | 51 |
| First Peak Temperature (Tp1) (° C.) | 62 | 60 | 57 | 59 | 59 | 64 | 57 | 59 |
| Final Peak Temperature (Tpf) (° C.) | 95 | 93 | 91 | 90 | 91 | 98 | 92 | 93 |
| $M_p$ 1st block (g/mol) | 65,342 | 58,175 | 66,973 | 51,412 | 60,149 | 62,385 | 57,527 | 64,339 |
| $M_n$ 3rd block (g/mol) | 12,856 | 17,135 | 17,754 | 18,699 | 22,696 | 14,314 | 22,419 | 26,102 |
| TTC $M_p$ (g/mol) | 118,502 | 126,900 | 151,700 | 128,086 | 162,578 | 118,289 | 118,298 | 126,633 |
| TTC Mooney Viscosity | 48.9 | 39.6 | 45.6 | 30.6 | 46.2 | 30.5 | 42.0 | 27.0 |
| 1,2-addition (vinyl) in 1st block (%) | 20.4 | 25.7 | 28.2 | 31.5 | 33.8 | 40.8 | 20.7 | 40.9 |

In Table 1,
[a] = weight % of total monomer mixture and
[b] = weight % of total reaction mixture.

In making the TTC 1 tapered triblock copolymer, CHX was added to a 5.3 L reactor in an amount equal to 83.3 wt % of the ultimate, total reaction mixture and heated to an initial reaction temperature Ti of 51° C. TMEDA polar modifier was added to the reactor in an amount of 0.0042 wt % of the total reaction mixture. STY and BD was added to the reactor, and the temperature was allowed to stabilize at Ti=51° C. The amount of STY added initially to the reactor was 5.4 wt % of the total amount of all monomer ultimately added to the reactor. The amount of BD added initially to the reactor was 45.4 wt % of the total amount of all monomer ultimately added to the reactor. An initiator was added to the reactor, and a first of three blocks was formed. The first block was 5.4+45.4=50.8 wt % of the total triblock copolymer, so the first block was about half of the weight of the total triblock copolymer. The first block contained 5.4/(5.4+45.4)=10.6 wt % STY and 89.4 wt % BD. The first block thus contained about 90 wt % BD and so was very rich in BD. In a next step, STY and BD were added to the reactor at the same time and polymerized to form a second or middle block. The amount of STY added or polymerized yielded a second block that contained 10.7 wt % of the total, ultimate monomer amount added to the reactor. The amount of BD added or polymerized yielded a second block that contained 20.7 wt % of the total, ultimate monomer amount added to the reactor. The second block therefore contained 10.7/(10.7+20.7)=34 wt % STY and 66 wt % BD. The first block of TTC 1 was about 90 wt % BD, and the second block was about two-thirds BD, so the first block was very rich in BD, and the second block was rich in BD. The second or middle block was about (10.7+20.7)/100=31.4 wt % of the total, ultimate triblock copolymer or roughly about a third of the total triblock copolymer. A third and final block was formed as a STY homopolymer. The final third block can be formed by either adding an excess of STY (compared to BD) while forming the second block so that the BD is depleted and the excess STY homopolymerizes, or additional STY can be added as a separate step. In either case a terminal end block of STY homopolymer is formed. The third and end block of STY in TTC 1 contains 17.7 wt % of the total amount of monomer addition. The first block of TTC 1 was about 50.8 wt % of TTC 1, the second block was about 31.4 wt % of TTC 1, and the third block was about 17.7 wt % of TTC 1, which accounts for 99.9 wt % of TTC 1 due to rounding of the numbers. The end, terminal STY block is relatively small at about 1/6 wt % of the total triblock copolymer, compared to the first block at about 3/6 of the total weight of the triblock copolymer and the middle block at about 2/6 wt %. For TTC 1, the end block that is rich in BD weighs about three times as much as the STY end block, and the middle block weighs about twice as much as the STY end block and about half as much as the BD-rich end block.

The Mooney viscosity of TTC 1 was 48.9, and the 1,2-addition vinyl content in the first block was 20.4%. Standard test ASTM D 3536 was used to determine the number average molecular weight (Mn) and peak average molecular weight (Mp) of the blocks in TTC 1-8. The first block in TTC 1 had an Mp of 65,342 g/mol, the third block had an Mn of 12,856 g/mol, and TTC 1 had an Mp of 118,502 g/mol. Generally, a preferred range of Mn for a tapered triblock copolymer according to the present invention is from about 50,000 to about 250,000 g/mol. Preferably, both the first BD-rich block and the second or middle block have about the same number average molecular weight range of from about 6,000 to about 210,000 g/mol, more preferably from about 15,000 to about 180,000 g/mol, and most preferably from about 15,000 to about 150,000 g/mol. The third block, which is the end homopolymer block of the monovinyl aromatic monomer, preferably has a number average molecular weight of from about 1,000 to about 140,000 g/mol, more preferably from about 2,500 to about 120,000 g/mol, and most preferably from about 2,500 to about 100,000 g/mol.

The values in Table 1 for tapered triblock copolymers TTC 2 to TTC 8 can be analyzed in the same manner as above for TTC 1. Considering all of TTC 1 to TTC 8, the wt % of the first block compared to the total triblock copolymer was 50.8, 42.1, 41.4, 37.4, 34.5, 48.5, 43.5, and 44.6, respectively, which provides a range of from 34.5 to 50.8 wt % of the total triblock copolymer, which is approximately 34 to 51 wt %. The percent BD in the first block in TTC 1 to TTC 8 was 89.4, 82.2, 80.0, 74.6, 70.4, 86.6, 83.0 and 86.5, respectively. The BD in the first block ranged from 70.4 to 89.4 wt % or from about 70 to about 90 wt % BD in the first BD-rich block. The wt % of the middle or second block compared to the total triblock copolymer was 31.4, 37.4, 40.5, 41.6, 45.4, 32.0, 28.5 and 24.6 for TTC 1 to TTC 8, respectively. The proportion of the middle block to the total triblock copolymer ranged from 24.6 to 45.4 wt %, which is about 25 to about 45 wt %. The portion of the middle block that was BD was 65.9, 54.8, 54.8, 47.4, 45.8, 60.9, 51.2 and 51.2 for TTC 1 to TTC 8, respectively. The portion of the middle block that was BD ranged from 45.8 to 65.9 wt %, which is from about 46 to 66 wt % BD in the middle block, and which can be characterized as roughly equal weight portions of STY and BD in the middle block. The third and end block is a polystyrene homopolymer, the proportion of which is 17.7, 20.6, 17.9, 21.2, 20.0, 19.2, 28.1 and 30.7 wt % of the total triblock copolymer for TTC 1 to TTC 8, respectively. The third block ranged from 17.7 to 30.7 wt % of the total triblock copolymer, which is from about 18 to 31 wt %. The first block, which was rich in BD, ranged from about 34 to about 51 wt %, the second or middle block, which had somewhat equal portions of STY and BD, ranged from about 25 to 45 wt %, and the third or end STY block ranged from about 18 to about 31 wt % of the total triblock copolymer. Generally, the first, BD-rich block and the second, middle block each range from about 30 to about 60 wt % of the total triblock copolymer; and the third, homopolymer block ranges from about 5 to about 40 wt % of the total triblock copolymer.

Turning to molecular weight, the Mp of the first, BD-rich block ranged from 51,412 to 66,973 g/mol, which is from about 50,000 to about 67,000 g/mol (or about 70,000 g/mol), for TTC 1 to TTC 8. The Mn of the third, terminal STY block ranged from 12,856 to 26,102 g/mol, which is from about 12,000 to about 27,000 g/mol, which can be characterized as ranging from about 10,000 to about 30,000 g/mol for TTC 1 to TTC 8. The total Mp for the tapered triblock copolymers ranged from 118,289 to 162,578 g/mol for TTC 1 to TTC 8, which is from about 118,000 to about 163,000 g/mol, which can be characterized as ranging from about 100,000 to about 200,000 g/mol. The Mooney viscosity ranged from 27.0 to 48.9, which is from about 27 to about 49, which can be characterized as ranging from about 25 to about 50 for TTC 1 to TTC 8. The 1,2-addition vinyl content in the first, BD-rich block ranged from 20.4 to 40.9%, which is from about 20 to about 41%, which can be characterized as ranging from about 15 to 45%. Generally, the first, BD-rich block preferably has a vinyl content of from about 10 to about 90 wt %, more preferably from about 15 to about 85 wt %, and most preferably from about 20 to about 80 wt %. The second, middle block preferably has a vinyl content of from about 10 to about 80 wt %, more preferably from about 10 to about 75 wt %, and most preferably from about 10 to about 70 wt %. Generally, the first, BD-rich block preferably has a styrene content of from about 10 to about 75 wt %, more preferably from about 10 to about 70 wt %, and most preferably from about 10 to about 65 wt %. The second, middle block preferably has a styrene content of from about 10 to about 85 wt %, more preferably from about 15 to about 80 wt %, and most preferably from about 20 to about 75 wt %. Generally, the third, STY homopolymer block preferably adds a styrene content to the tapered triblock copolymer of from about 5 to about 60 wt %, more preferably from about 5 to about 50 wt %, and most preferably from about 5 to about 40 wt %.

The polar modifier used for TTC 1 to TTC 8 was TMEDA, and similar results would be expected if THF had been used. The TMEDA ranged from 0.0042 to 0.0168 wt % of the total reaction mixture in TTC 1 to TTC 8. With respect to reactor temperature, which can be controlled using external cooling, Ti ranged from 50 to 53° C.; Tp1 ranged from 57 to 64° C.; and Tpf ranged from 90 to 98° C. for TTC 1 to TTC 8. The reactor temperature therefore ranged from about 50 to about 98° C. in making the tapered triblock copolymers TTC 1 to TTC 8, which is from about 50 to about 100° C. Generally, Ti is preferably maintained between about 30 and about 70° C.; Tp1 is preferably maintained between about 30 and about 90° C.; and Tpf is preferably maintained between about 75 and about 135° C.

One embodiment of the invention is a process for making a tapered triblock copolymer, comprises adding conjugated diene and monovinyl aromatic monomers to a reactor, wherein substantially more conjugated diene monomer than monovinyl aromatic monomer is added (on a weight basis) to the reactor; adding a polar modifier to the reactor; adding an initiator to the reactor and polymerizing the monomers to make a first block, wherein the first block is rich in the conjugated diene monomer; adding additional conjugated diene monomer and/or additional monovinyl aromatic monomer to the reactor and polymerizing to form a second block, wherein the second block has a lesser proportion of the conjugated diene monomer than the proportion of conjugated diene monomer in the first block; and forming a third block, wherein the third block is a homopolymer of the monovinyl aromatic monomer, thereby forming the tapered triblock copolymer. The first and third blocks are end blocks, the second block is a middle block between the first and third blocks, and the second block is bound directly to the first and third blocks. The proportion of the first block is preferably at least about one-third of the weight of the first, second and third blocks. The proportion of the second block is preferably at least about one-quarter of the weight of the first, second and third blocks. The proportion of the third block is preferably less than about one-third of the weight of the first, second and third blocks. The proportion of the first block is preferably no more than about one-half of the weight of the first, second and third blocks. The proportion of the second block is preferably no more than about one-half of the weight of the first, second and third blocks. The proportion of the third block is preferably at least about 15% of the weight of the first, second and third blocks. The proportion of the conjugated diene in the first block is preferably at least about 65 wt %. The proportion of the conjugated diene in the second block is preferably no more than about 70 wt %. The proportion of the conjugated diene in the first block ranges preferably between about 70 and about 90 wt % of the first block. The proportion of the conjugated diene in the second block ranges preferably between about 40 and about 70 wt % of the second block. The polymerization is preferably anionic and in the presence of a solvent. The initial and final reactor temperatures range preferably between about 40 and about 120° C. The polar modifier is preferably THF and/or TMEDA and is preferably in the total reaction mixture at a concentration of less than about 5 wt %, more preferably less than 0.5 wt % and most preferably less than 0.05 wt %. The peak average molecular weight of the tapered triblock copolymer ranges preferably between about 50,000 to about 200,000. The peak average molecular weight of the first block ranges preferably between about 50,000 to about 70,000. The number average molecular weight of the third block ranges preferably between about 10,000 to about 50,000. The Mooney viscosity of the tapered triblock copolymer ranges preferably between about 25 to about 50. The 1,2-addition vinyl content in the first block ranges preferably between about 15 and about 45%.

Another embodiment of the invention is a process for making a tapered triblock copolymer, comprises adding a solvent, a polar modifier and conjugated diene and monovinyl aromatic monomers to a reactor to form an initial reaction mixture, wherein the amount of the polar modifier in the initial reaction mixture is less than 10 wt %; adding an organolithium initiator compound to the reactor and anionically polymerizing the monomers to form a first end block, wherein the conjugated diene monomer in the first block ranges between 70 and 90 wt %; adding additional conjugated diene monomer and/or additional monovinyl aromatic monomer to the reactor and polymerizing to form a second block, wherein the conjugated diene monomer in the second block ranges between 40 and 70 wt %; and forming a third block, which is another end block, thereby forming the tapered triblock copolymer, wherein the third block is a homopolymer of the monovinyl aromatic monomer, wherein the second block is bound directly to the first and third blocks, wherein the first block comprises 30 to 60 wt % of the tapered triblock copolymer, wherein the second block comprises 20 to 50 wt % of the tapered triblock copolymer, wherein the third block comprises 10 to 40 wt % of the tapered triblock copolymer, wherein the solvent, the polar modifier, the conjugated diene monomer and the monovinyl aromatic monomers comprise a total reaction mixture, wherein the polar modifier is less than 5 wt % of the total reaction mixture, wherein the peak average molecular weight of the tapered triblock copolymer is between 75,000 and 250,000, wherein the peak average molecular weight of the first block is between 40,000 and 80,000, and wherein the number average molecular weight of the third block is between 5,000 and 40,000. The temperature in the reactor is preferably maintained below 130° C., more preferably between 40 and 110° C., and most preferably between 50 and 100° C., preferably by cooling the reactor.

Another embodiment of the invention is a tapered triblock copolymer composition that includes first and second end blocks and a middle block between and bound directly to the first and second end blocks, the first end block and the middle block comprising a copolymer of conjugated diene and a monovinyl aromatic monomers and the second end block comprising a monovinyl aromatic polymer; the first end block being rich in conjugated diene monomer and richer in conjugated diene monomer than the middle block; the first end block comprising 30 to 60 wt % of the tapered triblock copolymer; the middle block comprising 20 to 50 wt % of the tapered triblock copolymer; the second end block comprising 10 to 40 wt % of the tapered triblock copolymer; and the tapered triblock copolymer having a peak average molecular weight between about 50,000 and about 250,000. The first end block and the middle block each have preferably a peak average molecular weight between about 15,000 and about 150,000, and the second end block block has preferably a number average molecular weight between about 2,500 and about 100,000. The conjugated diene monomer is preferably 1,3 butadiene and/or isoprene, and the monovinyl aromatic monomer is preferably styrene. The first end block comprises preferably at least about 65 wt % conjugated diene monomer. The middle block comprises preferably no more than about 70 wt % conjugated diene monomer. The proportion of the conjugated diene in the first end block ranges preferably between about 70 and about 90 wt % of the first end block. The proportion of the conjugated diene in the middle block ranges preferably between about 40 and about 70 wt % of the middle block. The peak average molecular weight of the tapered triblock copolymer is preferably between 75,000 and 250,000. The peak average molecular weight of the first end block is preferably between 40,000 and 80,000. The number average molecular weight of the second end block is preferably between 5,000 and 40,000. The 1,2-addition vinyl content of the first end block is preferably between 15 and 45%.

Example 2

Applications in Polymer Reinforced Asphalt for Road Paving

Dry, gel-free tapered triblock copolymers, TTC 1, 2 and 4 (Table 1), prepared as described in Example 1, were used as asphalt modifiers or asphalt reinforcing agents in road paving formulations. To this end, AC-20 asphalt (provided by PEMEX) was formulated by a hot mix process. In this process, a high-shear mixer (ROSS ML100) was employed. First, 96 parts of AC-20 asphalt were heated without agitation to 120° C. to soften the asphalt under a nitrogen atmosphere. During this stage very slow agitation was employed to prevent asphalt overheating and oxidation. Once the asphalt was soft, heating continued to 190° C.+/−5° C. and the mixer agitation was increased to 2500 RPM. As 190° C. was reached, 4 parts of the tapered triblock copolymer were gradually added to the asphalt at a rate of about 10 g/min. The agitation was maintained for 120-180 minutes for the effective and total dispersion of the TTC as reinforcing agent. To ensure that the same level of dispersion was achieved in all formulations, the TTC dispersion in asphalt was monitored through fluorescence microscopy using a Zeiss microscope Axiotecy 20X model.

Some asphalt formulations were vulcanized by adding the specified amount of sulfur immediately after complete dispersion of the TTC in the asphalt and keeping the agitation at 190° C. for 60 minutes more.

The asphalt formulations thus obtained were characterized against the AC-20 unmodified (neat) asphalt control by Ring and Ball Softening Point Temperature ($T_{RBSP}$) according to ASTM D36. Penetration was measured according to ASTM D5 at 25° C., 10 seconds and 100 grams using a Koheler Penetrometer model K95500. Maximum application temperature ("Max use T") was measured as the temperature at which the Rutting Factor or Dynamic Shear Stiffness (G*/sin δ) takes the value of 1.0 KPa, where G* is the complex modulus and sin δ is the phase angle according to AASHTO TP5 by using a Paar Physica rheometer model MCR-300-SP. Dynamic viscosity at 135° C. was measured according to ASTM D4402 by using a Brookfield viscometer model RDVS-II+. Elastic recovery in torsion mode was measured according to AASHTO-TF31R.

Morphology stability, compatibility or phase separation was measured as per ASTM D5976 as the percent difference between the $T_{RBSP}$ (measure as per ASTM D36) at the top and bottom sections of a cylindrical probe, made in the interior of a sealed tube containing the formulated asphalt, and aged at 163° C. for 48 hours in vertical position without agitation.

The values obtained for the properties in the upper and lower sections are used as follows to calculate the percent of phase separation:

$$\Delta T_{RBSP} = \text{highest} T_{RBSP} \text{value} - \text{lowest} T_{RBSP} \text{value } \%$$
$$\text{Separation}_{RBSP} = (\Delta T_{RBSP}/\text{highest} T_{RBSP} \text{value})*100$$

Results are given in Table 2 below and show the enhanced performance of the tapered triblock copolymers as asphalt modifiers, against unmodified (neat) asphalt and asphalt modified with Control 1.

TABLE 2

Performance of TTC in Asphalt Reinforcement for Road Paving

| Asphalt | Modifier | Modifier (%) | Sulfur (%) | $T_{RBSP}$ (° C.) | Penetration @ 25° C. (dmm) | Brookfield Viscosity @ 135° C. (cP) | Elastic Recovery (%) | Max use T G*/sinδ = 1 Kpa (° C.) | Phase Separation (%) |
|---|---|---|---|---|---|---|---|---|---|
| AC-20 | None | 0 | 0.0 | 52 | 86 | 582 | — | 68.4 | — |
| AC-20 | Control 1 | 4 | 0.0 | 68 | 57 | 1638 | 14 | 83.8 | 9 |
| AC-20 | Control 1 | 4 | 1.0 | 71 | 51 | 1990 | 47 | 84.3 | 6 |
| AC-20 | TTC 1 | 4 | 0.0 | 67 | 60 | 1525 | 14 | 83.8 | 9 |
| AC-20 | TTC 1 | 4 | 0.5 | 69 | 51 | 1638 | 35 | 83.5 | 4 |
| AC-20 | TTC 1 | 4 | 0.75 | 72 | 50 | 1700 | 45 | 84.3 | 1 |
| AC-20 | TTC 1 | 4 | 1.0 | 72 | 52 | 1712 | 46 | 84.6 | 2 |
| AC-20 | TTC 2 | 4 | 0.0 | 67 | 51 | 1587 | 14 | 82.9 | — |
| AC-20 | TTC 2 | 4 | 0.5 | 64 | 51 | 1625 | 31 | 85.7 | — |
| AC-20 | TTC 2 | 4 | 0.75 | 68 | 48 | 1750 | 40 | 86.2 | — |
| AC-20 | TTC 2 | 4 | 1.0 | 66 | 48 | 1725 | 45 | 87.4 | — |
| AC-20 | TTC 4 | 4 | 0.0 | 67 | 51 | 1525 | 13 | 81.3 | — |
| AC-20 | TTC 4 | 4 | 0.5 | 62 | 49 | 1450 | 36 | 84.5 | — |
| AC-20 | TTC 4 | 4 | 0.75 | 66 | 47 | 1625 | 40 | 85.0 | — |
| AC-20 | TTC 4 | 4 | 1.0 | 64 | 48 | 1538 | 46 | 85.3 | — |

Reviewing Table 2, the results show a significant improvement over the properties of the neat AC-20 (PG 64-22) asphalt when the asphalt is formulated with Control 1 and TTC 1, 2 and 4 modifiers. Specifically, the asphalts modified with TTC 1, 2 and 4 demonstrate a noticeably lower viscosity, higher softening temperature, lower penetration, and higher maximum application temperature compared to the asphalt modified with Control 1. The much lower viscosity of the asphalt formulations with TTC 1, 2 and 4, besides contributing to improve the dispersion into the asphalt, also facilitates the processing, handling and application of the modified asphalt blends by improving pumping capacity and/or decreasing the energy required to apply it. Furthermore, the asphalts modified with TTC 1, 2 and 4, formulated with different sulfur content, demonstrate an improvement in compatibility by decreasing the amount of vulcanization agent needed to stabilize the different phases in the blend without diminishing the performance properties. This also means an important cost reduction and a more environmentally-friendly process.

Fluorescence microscopy images were obtained from reinforced asphalts for Control 1, and TTC 1, 2 and 4 to observe the morphology of both polymer-rich phase and asphalt-rich phase. The polymer-rich phase is observed as the brighter regions and asphalt rich phase as the darker regions. Micrographs were taken at a magnification of 20x. As an illustrative example, a qualitative comparison of the fluorescent microscopy images for Control 1 and TTC 1 revealed that the polymer phase in TTC 1 was better dispersed than that in TTC 1. The reduction in particle size is evidence of enhanced compatibility with asphalt, in agreement with the findings of L. H. Lewandowski (1994), Rubber Chemistry and Technology, Rubber Reviews, Vol. 67, No. 3, pp. 447-480.

Example 3

Applications in Polymer Reinforced Asphalt for Road Paving

Polymer-modified asphalt formulations were prepared with asphalt Redaspol 90 JLF/015697 (bitumen provided by Repsol-YPF) and tapered triblock copolymer TTC 1 (Table 1) at several modifier concentrations. This TTC was further evaluated as asphalt modifier or asphalt reinforcing agent in road paving formulation, and also formulated by a similar hot mix process with a high-shear mixer (Silverson). First, the specified parts of asphalt Redaspol 90 were heated without agitation to 120° C. to soften the asphalt under a nitrogen atmosphere. During this stage very slow agitation was employed to prevent asphalt overheating and oxidation. Once the asphalt was soft, heating continued to 180° C.+/−5° C. and the mixer agitation speed was increased to 2500 RPM. As 180° C. was reached, the specified parts of the tapered triblock copolymer were gradually added to the asphalt at a rate of about 10 g/min. The mixing was kept during 120 minutes for the effective and total dispersion of the TTC as reinforcing agent. To ensure that the same level of dispersion was achieved in all formulations, the TTC dispersion in asphalt was monitored through fluorescence microscopy using a Zeiss microscope Axiotecy 20X model.

Some asphalt formulations were vulcanized by adding the specified amount of sulfur immediately after complete dispersion of the TTC in the asphalt and keeping the agitation at 180° C. for 60 minutes more.

The asphalt formulations thus obtained were characterized against the Redaspol 90 unmodified asphalt control by Ring and Ball Softening Point Temperature ($T_{RBSP}$) according to NLT-125. Penetration was measured according to NLT-124 at 25° C., 10 s and 100 g using a Koheler Penetrometer model K95500. Dynamic viscosity at 160° C. was measured according to NLT-375 by using a Brookfield viscometer model RDVS-II+. Elastic recovery at 25° C. was measured according to NLT-329 by means of a ductilometer. Fraass breaking point temperature was measured according to NLT-182. Ductility at 10° C. was measured according to NLT-126.

Results are given in Table 3 below and show the enhanced performance of the tapered triblock copolymers as asphalt modifiers, against unmodified asphalt and asphalt modified with Control 1.

TABLE 3

Performance of TTC in Asphalt Reinforcement for Road Paving

| Asphalt | Modifier | Modifier (%) | Sulfur (%) | $T_{RBSP}$ (° C.) | Penetration @ 25° C. (dmm) | Brookfield Viscosity @ 160° C. (cP) | Elastic Recovery @ 25° C. (%) | Fraass Breaking Point (° C) | Ductility @ 10° C. (cm) |
|---|---|---|---|---|---|---|---|---|---|
| Redaspol 90 | None | 0.0 | 0.0 | 49 | 90 | 80 | — | −10 | — |
| Redaspol 90 | Control 1 | 4.0 | 0.0 | 56 | 71 | 318 | 59 | −17 | 10 |
| Redaspol 90 | Control 1 | 3.0 | 0.2 | 56 | 69 | 350 | 82 | −17 | 41 |
| Redaspol 90 | Control 1 | 4.0 | 0.2 | 64 | 67 | 465 | 88 | −17 | 50 |
| Redaspol 90 | Control 1 | 5.0 | 0.2 | 71 | 63 | 650 | 91 | −18 | 59 |
| Redaspol 90 | TTC 1 | 4.0 | 0.0 | 55 | 67 | 316 | 58 | −16 | 16 |
| Redaspol 90 | TTC 1 | 3.0 | 0.2 | 57 | 69 | 384 | 84 | −14 | 36 |
| Redaspol 90 | TTC 1 | 4.0 | 0.2 | 70 | 66 | 544 | 89 | −15 | 48 |
| Redaspol 90 | TTC 1 | 5.0 | 0.2 | 79 | 62 | 800 | 93 | −18 | 57 |

Reviewing Table 3, the results show a significant improvement over the properties of the neat Redaspol 90 asphalt when the asphalt is formulated with Control 1 and TTC 1 modifiers, even at the lowest polymer concentration and without vulcanizing with sulfur. Specifically, the asphalt modified with TTC 1 demonstrates a noticeably higher softening point temperature, slightly higher viscosity, and higher elastic recovery compared to the asphalt modified with Control 1. The viscosities of the asphalt modified with TTC 1 at 3, 4 and 5% modifier concentrations are slightly higher than those of the asphalt modified with Control 1. Although the viscosities are on the lower end of the viscosity range commonly used in the asphalt industry, the increased properties are attributed to the increased compatibility with this particular asphalt. The much higher softening point temperature of the asphalt modified with TTC 1, over the performance of both the neat Redaspol 90 asphalt and the asphalt modified with Control 1, should provide a much better resistance to flow and deformation at high temperatures. Surprisingly, the asphalt modified with TTC 1 and formulated with lower polymer content, provide similar performance properties ($T_{RBSP}$) and lower viscosity than the asphalt modified with Control 1. This also means an important cost reduction and an energy-saving process.

Example 4

Applications in Polymer Reinforced Asphalt for Roofing and Waterproof Coatings

Dry, gel-free tapered triblock copolymer TTC 1 (Table 1), prepared in Example 1, was used as asphalt modifiers or asphalt reinforcing agents for Roofing and Waterproof Coatings applications. To this end, 88 parts of AC-20 asphalt (provided by PEMEX) were formulated with 12 parts of the TTC 1 polymer by a hot-mix process following the procedure and testing methods described in Example 2. Results are given in Table 4 below and show the enhanced performance of the TTC 1 reinforced asphalt against unmodified asphalt and asphalt modified with Control 1.

TABLE 4

Performance of TTC in Asphalt Reinforcement for Roofing and Waterproof Coatings

| Asphalt | Modifier | Modifier (%) | $T_{RBSP}$ (° C.) | Penetration @ 25° C. (dmm) | Brookfield Viscosity @ 135° C. (cP) | Brookfield Viscosity @ 160° C. (cP) |
|---|---|---|---|---|---|---|
| AC-20 | None | 0 | 52 | 86 | 582 | — |
| AC-20 | Control 1 | 12 | 79 | 48 | 10950 | 3750 |
| AC-20 | TTC 1 | 12 | 82 | 51 | 9762 | 3162 |

Reviewing Table 4, the results show a significant improvement over the properties of the neat AC-20 (PG 64-22) asphalt when the asphalt is formulated with Control 1 and TTC 1 modifiers. Specifically, the asphalt modified with TTC 1 demonstrates a noticeably lower viscosity at 135° C. and 160° C., and higher softening point temperature.

Example 5

Applications in Polymer Reinforced Asphalt for Roofing and Waterproof Coatings Dry, gel-free tapered triblock copolymer TTC 1 (Table 1), prepared in Example 1, was used as asphalt modifiers or asphalt reinforcing agents for Roofing and Waterproof Coatings applications. To this end, 88 parts of Redaspol 90 asphalt (provided by Repsol-YPF) were formulated with 12 parts of the TTC 1 polymer by a hot-mix process following the procedure and testing methods described in Example 3. Results are given in Table 5 below and show the enhanced performance of the TTC reinforced asphalts against unmodified asphalt and asphalt modified with Control 1.

TABLE 5

Performance of TTC in Asphalt Reinforcement for Roofing and Waterproof Coatings

| Asphalt | Modifier | Modifier (%) | $T_{RBSP}$ (° C.) | Penetration @ 25° C. (dmm) | Brookfield Viscosity @ 160° C. (cP) |
|---|---|---|---|---|---|
| Redaspol 90 | None | 0 | 49 | 90 | 80 |
| Redaspol 90 | Control 1 | 12 | 66 | 96 | 1662 |
| Redaspol 90 | TTC 1 | 12 | 68 | 73 | 1470 |

Reviewing Table 5, the results show a significant improvement over the properties of the neat Redaspol 90 asphalt when the asphalt is formulated with Control 1 and TTC 1 modifiers. Specifically, the asphalt modified with TTC 1 demonstrates a noticeably lower viscosity at 160° C. and lower penetration, and higher softening point temperature.

Example 6

Applications in Pressure Sensitive Adhesives, Hot Melt Adhesives and Hot Melt Pressure Sensitive Adhesives Dry, gel-free tapered triblock copolymers TTC 1 (Table 1), prepared in Example 1, was used in pressure sensitive adhesive (PSA) and hot melt adhesive (HMA) formulations. The adhesive formulations were prepared by a hot mix process using a propeller mixer. First, the specified parts of naphthenic plasticizer (15 to 30% by weight), tackifying resin (40 to 60% by weight) and antioxidant (0.5 to 2.0% by weight) were heated to 135° C. to soften the tackifier under a nitrogen atmosphere. At this stage, very slow agitation was employed to prevent overheating and oxidation. Once the tackifier was softened, temperature was set at 155° C. and agitation speed was increased to 300 RPM and kept for 30 minutes. As the temperature of 155° C. was reached, the specified parts of the tapered triblock copolymer and any other polymer (15 to 30% by weight) were gradually added at a rate of about 15 g/min and the mixer agitation speed was gradually increased to 750 RPM. At this final stage, the temperature was increased and controlled at 172.5±2.5° C. The mixing was kept during 120 minutes for the effective and total dispersion of the polymers. The resulting adhesive was allowed to cool at room temperature.

The adhesive blends were formulated with 15% by weight of naphthenic plasticizer (SHELLFLEX 6371), 55% by weight of tackifying resin (C5 hydrocarbon resin, $T_{RBSP}$=98° C.), 0.6% by weight of antioxidant (Irganox 1010), and 29.4% by weight of total polymer. The total polymer consisted of tapered triblock copolymer or Control 1 as modifiers combined in a 35/65 ratio with a commercially available SIS block copolymer as base polymer.

The performance of the adhesive formulations was tested through Brookfield viscosity, ring and ball softening point, tensile, loop tack, peel, shear methods. Brookfield viscosity at 150°, 160° and 177° C. was measured according to ASTM D1084/D2556. Ring and Ball Softening Point temperature ($T_{RBSP}$) was measured according to ASTM D36. Loop tack at 23° C. was measured according to PSTC-5. Peel and Shear strengths were measured according to PSTC-1 and ASTM D3654 at 23° C. Tensile strength at 23° C. was measured according to a modified ASTM D3759 by using an Instron Universal Testing Machine model 5564. The performance of the adhesive blends modified with tapered triblock copolymer TTC 1 or Control 1 is shown below in Table 6, compared to a suitable unmodified control blend containing only base polymer.

TABLE 6

Performance of TTC in Pressure Sensitive Adhesives

| Adhesive Identification | Base Polymer | Modifier | Brookfield Viscosity @ 150° C. (cP) | Brookfield Viscosity @ 160° C. (cP) | Brookfield Viscosity @ 177° C. (cP) | $T_{RBSP}$ (° C.) | Tensile Strength (kgf/cm$^2$) | Loop Tack (lb-in) | Peel Strength (lb-in) | Shear Strength (min) |
|---|---|---|---|---|---|---|---|---|---|---|
| Control Blend | SIS | None | 49125 | 23400 | 9360 | 103.5 | 2.4 | 9.3 | 9.9 | 52 |
| A1 | SIS | Control 1 | 35620 | 17875 | 8158 | 95.5 | 3.6 | 8.6 | 9.9 | 90 |
| A2 | SIS | TTC 1 | 36972 | 18375 | 8242 | 97 | 3.9 | 8.6 | 10.0 | 130 |

In Table 6, the adhesives A1 and A2 show a significant improvement over the performance properties of the Control Blend, particularly in cohesive strength, when the adhesive blend is formulated with Control 1 or TTC 1 modifiers. Specifically, the adhesive blends modified with TTC 1 and Control 1 show noticeably lower viscosities at 150, 160 and 177° C., higher tensile strength, and higher shear strength. More specifically, the adhesive blend modified with the tapered triblock copolymer TTC 1 show better performance properties when compared against Control 1, particularly in shear strength.

Example 7

Applications in Pressure Sensitive Adhesives, Hot Melt Adhesives and Hot Melt Pressure Sensitive Adhesives Dry, gel-free tapered triblock copolymers TTC 1, 3 and 5 (Table 1), prepared in Example 1, were used in pressure sensitive adhesive (PSA) and hot melt adhesive (HMA) formulations. The adhesive formulations were prepared by a hot mix process following the procedure and testing methods described in Example 6.

The adhesive blends were formulated with 24% by weight of naphthenic plasticizer (SHELLFLEX 6371), 50% by weight of tackifying resin (styrenated polyterpene resin, $T_{RBSP}$=108° C.), 1.0% by weight of antioxidant (Irganox 1330/Irgafos 168), and 25% by weight of total polymer. The total polymer consisted of tapered triblock copolymer or Control 1 as modifiers combined in a 66.5/33.5 ratio with a commercially available SBS block copolymer as base polymer. The performance of the adhesive blends modified with tapered triblock copolymer TTC 1 or Control 1 is shown below in Table 7.

In Table 8, the adhesive blends A6, A7 and A8 formulated with TTC 1, 3 and 5, respectively, show a significant improvement over the performance properties of the adhesive A5 formulated with Control 1. Specifically, the adhesive blend A6 modified with TTC 1 show noticeably lower viscosities at 150, 160 and 177° C., and slightly higher ring and ball softening point temperature ($T_{RBSP}$). More specifically, the adhesive blend A7 modified with TTC 3 show a different balance in performance properties compared to the adhesive blend A5 modified with Control 1, much higher ring and ball softening point temperature ($T_{RBSP}$) and similar viscosity at 177° C. Even more specifically, the adhesive blend A8 modified with TTC 5 show a much better balance in performance properties compared to the adhesive blend A5 modified with Control 1,

TABLE 7

Performance of TTC in Pressure Sensitive Adhesives

| Adhesive Identification | Base Polymer | Modifier | Brookfield Viscosity @ 150° C. (cP) | Brookfield Viscosity @ 160° C. (cP) | Brookfield Viscosity @ 177° C. (cP) | $T_{RBSP}$ (° C.) | Tensile Strength (kgf/cm$^2$) | Loop Tack (lb-in) | Peel Strength (lb-in) |
|---|---|---|---|---|---|---|---|---|---|
| A3 | SBS | Control 1 | 7000 | 5100 | 3275 | 70.2 | 1.1 | 8.0 | 5.8 |
| A4 | SBS | TTC 1 | 6025 | 4265 | 2661 | 71.4 | 0.93 | 7.2 | 7.7 |

In Table 7, the adhesive A4 formulated with TTC 1 show a significant improvement over the performance properties of the adhesive A3 formulated with Control 1. Specifically, the adhesive blend modified with TTC 1 show noticeably lower viscosities at 150, 160 and 177° C., slightly higher ring and ball softening point temperature, and higher peel strength.

Example 8

Applications in Pressure Sensitive Adhesives, Hot Melt Adhesives and Hot Melt Pressure Sensitive Adhesives Dry, gel-free tapered triblock copolymers TTC 1, 3 and 5 (Table 1), prepared in Example 1, were used in pressure sensitive adhesive (PSA) and hot melt adhesive (HMA) formulations. The adhesive formulations were prepared by a hot mix process following the procedure and testing methods described in Example 6.

The adhesive blends were formulated with 24% by weight of naphthenic plasticizer (SHELLFLEX 6371), 50% by weight of tackifying resin (styrenated polyterpene resin, $T_{RBSP}$=108° C.), 1.0% by weight of antioxidant (Irganox 1330/Irgafos 168), and 25% by weight of a tapered triblock copolymer or Control 1. The performance of the adhesive blends modified with tapered triblock copolymers TTC 1, 3 or 5, and Control 1 is shown below in Table 8.

Example 9

Applications in Non-Pressure Sensitive Adhesives, Hot Melt Adhesives and Hot Melt Non-Pressure Sensitive Adhesives Dry, gel-free tapered triblock copolymers TTC 1 and 5 (Table 1), prepared in Example 1, were used in non-pressure sensitive adhesive (PSA) and hot melt adhesive (HMA) formulations. The adhesive formulations were prepared by a hot mix process following the procedure and testing methods described in Example 6.

The adhesive blends were formulated with 27% by weight of paraffin plasticizer, 43% by weight of tackifying resin (styrenated polyterpene resin, $T_{RBSP}$=108° C.), 1.0% by weight of antioxidant (Irganox 1330/Irgafos 168), and 29% by weight of a tapered triblock copolymer or Control 1. The performance of the adhesive blends A10 and A11 modified with tapered triblock copolymer TTC 1 or 5, respectively, against the adhesive blend A9 modified with Control 1 is shown below in Table 9.

TABLE 8

Performance of TTC in Pressure Sensitive Adhesives

| Adhesive Identification | Modifier | Brookfield Viscosity @ 150° C. (cP) | Brookfield Viscosity @ 160° C. (cP) | Brookfield Viscosity @ 177° C. (cP) | $T_{RBSP}$ (° C.) | Tensile Strength (kgf/cm$^2$) | Elongation (%) |
|---|---|---|---|---|---|---|---|
| A5 | Control 1 | 7375 | 5294 | 3414 | 56.7 | — | — |
| A6 | TTC 1 | 5656 | 3946 | 2420 | 57.1 | — | — |
| A7 | TTC 3 | 9370 | 6393 | 3683 | 70.2 | 0.32 | 2033 |
| A8 | TTC 5 | 7742 | 5222 | 2906 | 70.3 | 0.11 | 2033 |

TABLE 9

Performance of TTC in Non-Pressure Sensitive Adhesives

| Adhesive Identification | Modifier | Brookfield Viscosity @ 150° C. (cP) | Brookfield Viscosity @ 160° C. (cP) | Brookfield Viscosity @ 177° C. (cP) | $T_{RBSP}$ (° C.) | Tensile Strength (kgf/cm$^2$) | Elongation (%) |
|---|---|---|---|---|---|---|---|
| A9 | Control 1 | 4196 | 3293 | 2243 | 64.5 | 0.81 | 214 |
| A10 | TTC 1 | 4900 | 3310 | 2126 | 59.0 | — | — |
| A11 | TTC 5 | 11925 | 9360 | 2606 | 66.2 | 18.0 | 183 |

Embodiments of the Invention

Additional embodiments of the present invention are set forth as follows.

1. A composition, comprising: a tapered triblock copolymer having the formula B-(B/A)-A and having at least one B block, at least one (B/A) block and at least one A block, wherein: (a) each B block is a conjugated diene-rich copolymer block of at least one conjugated diene monomer and at least one monovinyl aromatic monomer, said copolymer block being further characterized in having: (i) a controlled vinyl distribution along the polymer chain; and (ii) a monovinyl aromatic monomer content of at least 10 percent weight based on the total amount of monovinyl aromatic monomer in the tapered triblock copolymer; (b) each (B/A) block is a statistically distributed monovinyl aromatic-rich copolymer block of at least one conjugated diene monomer and at least one monovinyl aromatic monomer, said copolymer block being further characterized in having: (i) an adjacent B block and an adjacent A block; (ii) a size larger than the one obtained under conventional alkyllithium-initiated anionic copolymerization in polar additive-free aliphatic solvent; (iii) a number average molecular weight of at least 5 percent based on the total number average molecular weight of the B-(B/A)-A tapered triblock copolymer; and (iv) a monovinyl aromatic monomer content of at least 5 percent weight based on the total amount of monovinyl aromatic monomer in the tapered triblock copolymer; and (c) each A block is a polymer block of at least one monovinyl aromatic monomer.

2. The composition of embodiment 1, wherein (a) the number average molecular weight of the tapered triblock copolymer is from about 20,000 to about 350,000 g/mol; (b) the total amount of monovinyl aromatic monomer in the tapered triblock copolymer is from about 10 percent weight to about 85 percent weight; and (c) the total vinyl configuration content is from about 10 percent weight to about 90 percent weight based on the total amount of conjugated diene in the tapered triblock copolymer.

3. The composition of embodiment 1, wherein said monovinyl aromatic monomer is styrene and said conjugated diene is selected from the group consisting of butadiene and isoprene.

4. The composition of embodiment 1, where said conjugated diene units are selectively, partially or fully hydrogenated.

5. The composition of embodiment 1, wherein the tapered triblock copolymer has the general configuration [B-(B/A)-A]n-X or X-[B-(B/A)-A]n where X is the residue of either a coupling agent or a multifunctional initiator and n is an integer from 2 to about 30, and mixtures thereof, wherein: (a) the number average molecular weight of the tapered triblock copolymer is from about 30,000 to about 1,000,000 g/mol; (b) the total amount of monovinyl aromatic monomer in the tapered triblock copolymer is from about 10 percent weight to about 85 percent weight; and (c) the total vinyl configuration content is from about 10 percent weight to about 90 percent weight based on the total amount of conjugated diene in the tapered triblock copolymer.

6. The composition of embodiment 5, wherein said monovinyl aromatic monomer is styrene and said conjugated diene is selected from the group consisting of butadiene and isoprene.

7. The composition of embodiment 5, wherein said conjugated diene units are selectively, partially or fully hydrogenated.

8. The composition of embodiment 5, wherein either: (a) the tapered triblock copolymer with general configuration [B-(B/A)-A]n-X is either totally or partially coupled with a coupling agent; or (b) the tapered triblock copolymer with general configuration X-[B-(B/A)-A]n is either totally or partially initiated with a multifunctional initiator.

9. A process for making tapered triblock copolymers, comprising: reacting at least one conjugated diene monomer and at least one monovinyl aromatic monomer under anionic polymerization conditions in the presence of a suitable polar additive or combination of polar additives; and forming a tapered triblock copolymer having the formula B-(B/A)-A and having at least one B block, at least one (B/A) block and at least one A block, wherein: (a) each B block is a conjugated diene-rich copolymer block of at least one conjugated diene monomer and at least one monovinyl aromatic monomer, said copolymer block being further characterized in having: (i) a controlled vinyl distribution along the polymer chain; and (ii) a monovinyl aromatic monomer content of at least 10 percent weight based on the total amount of monovinyl aromatic monomer in the tapered triblock copolymer; (b) each (B/A) block is a statistically distributed monovinyl aromatic-rich copolymer block of at least one conjugated diene monomer and at least one monovinyl aromatic monomer, said copolymer block being further characterized in having: (i) an adjacent B block and an adjacent A block; (ii) a size larger than the one obtained under conventional alkyllithium-initiated anionic copolymerization in polar additive-free aliphatic solvent; (iii) a number average molecular weight of at least 5 percent based on the total number average molecular weight of the B-(B/A)-A tapered triblock copolymer; and (iv) a monovinyl aromatic monomer content of at least 5 percent weight based on the total amount of monovinyl aromatic monomer in the tapered triblock copolymer; and (c) each A block is a polymer block of at least one monovinyl aromatic monomer.

10. A bituminous composition comprising: (a) at least one bitumen; (b) at least one additive selected from the group consisting of plasticizers; fillers; crosslinking agents; flow resins; tackifying resins; processing aids; antiozonants; and antioxidants; and (c) at least one tapered triblock copolymer having the composition of embodiment 1 or 5, wherein the bituminous composition includes from about 0.5 to about 25 percent weight of said at least one tapered triblock copolymer.

11. A bituminous composition according to embodiment 10, wherein said tapered triblock copolymer is in the form of a bale, free-flowing, powder, emulsion, or encapsulated.

12. A bituminous composition according to embodiment 10, further comprising at least one emulsifying agent, wherein said bituminous composition is emulsified in water.

13. A bituminous composition, comprising: (a) at least one bitumen; (b) at least one additive selected from the group consisting of plasticizers; fillers; crosslinking agents; flow resins; tackifying resins; processing aids; antiozonants; and antioxidants; and (c) a blend of a tapered triblock copolymer having the composition of embodiment 1 or 5 and a block copolymer, wherein the bituminous composition contains from about 0.5 to about 25 percent weight of the blend.

14. A bituminous composition according to embodiment 13, wherein said tapered triblock copolymer is in the form of a bale, free-flowing, powder, emulsion, or encapsulated.

15. A bituminous composition according to embodiment 13, further comprising at least one emulsifying agent, wherein said bituminous composition is emulsified in water.

16. An adhesive composition, comprising: (a) at least one additive selected from the group consisting of tackifying resins; plasticizers; coupling agents; crosslinking agents; photoinitiators; and antioxidants; and (b) at least one tapered triblock copolymer having the composition of embodiment 1 or 5, wherein the adhesive composition includes from about 0.5 to about 50 percent weight of said at least one tapered triblock copolymer.

17. An adhesive composition, comprising: (a) at least one additive selected from the group consisting of tackifying resins; plasticizers; coupling agents; crosslinking agents; photoinitiators; and antioxidants; and (b) a blend of a tapered triblock copolymer having the composition of embodiment 1 or 5 and a block copolymer, wherein the adhesive composition contains from about 0.5 to about 50 percent weight of the blend.

18. A sealant composition, comprising: (a) at least one additive selected from the group consisting of tackifying resins; plasticizers; fillers; coupling agents; processing aids; and antiozonants; and (b) at least one tapered triblock copolymer having the composition of embodiment 4 or 7, wherein the sealant composition includes from about 0.5 to about 50 percent weight of said at least one tapered triblock copolymer.

19. A sealant composition, comprising: (a) at least one additive selected from the group consisting of tackifying resins; plasticizers; fillers; coupling agents; processing aids; and antiozonants; and (b) a blend of a tapered triblock copolymer having the composition of embodiment 4 or 7 and a block copolymer, wherein the sealant composition contains from about 0.5 to about 50 percent weight of the blend.

20. A plastic composition comprising: (a) at least one plastic selected from the group consisting of polyolefins, polyamides, polyurethanes, polyethers, polysulfones, polyether ketones, polyether ether ketones, polyimides, polyetherimides, polycarbonates, polyesters, polystyrene and copolymers thereof; (b) at least one additive selected from the group consisting of plasticizers; fillers; crosslinking agents; processing aids; antiozonants; and antioxidants; and (c) at least one tapered triblock copolymer having the composition of embodiment 4 or 7, wherein the plastic composition includes from about 0.5 to about 75 percent weight of said at least one tapered triblock copolymer.

21. A plastic composition comprising: (a) at least one plastic selected from the group consisting of polyolefins, polyamides, polyurethanes, polyethers, polysulfones, polyether ketones, polyether ether ketones, polyimides, polyetherimides, polycarbonates, polyesters, polystyrene and copolymers thereof; (b) at least one additive selected from the group consisting of plasticizers; fillers; crosslinking agents; processing aids; antiozonants; and antioxidants; and (c) a blend of a tapered triblock copolymer having the composition of embodiment 4 or 7 and a block copolymer, wherein the plastic composition contains from about 0.5 to about 75 percent weight of the blend.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

What is claimed is:

1. A composition, comprising: a tapered triblock copolymer having the formula B-(B/A)-A and having at least one B block, at least one (B/A) block and at least one A block, wherein:
   (a) the B block comprises at least one conjugated diene monomer and at least one monovinyl aromatic monomer, wherein the B block ranges from about 34 to about 51 wt % of the tapered triblock copolymer, wherein the amount of the conjugated diene monomer in the B block ranges from about 70 to about 90 wt %, and wherein the 1,2-addition-vinyl content in the B block ranges from about 20 to about 41 wt % of the amount of the conjugated diene monomer in the B block,
   the B block being further characterized in having:
      (i) a controlled vinyl distribution along the polymer chain; and
      (ii) a monovinyl aromatic monomer content of at least 10 percent weight based on the total amount of monovinyl aromatic monomer in the tapered triblock copolymer;
   (b) the (B/A) block comprises at least one conjugated diene monomer and at least one monovinyl aromatic monomer, wherein the (B/A) block ranges from about 24 to about 46 wt % of the tapered triblock copolymer, and wherein the amount of the conjugated diene monomer in the (B/A) block ranges from about 45 to about 66 wt %,
   the (B/A) block being further characterized in having:
      (i) an adjacent B block and an adjacent A block;
      (ii) a number average molecular weight of at least 5 percent based on the total number average molecular weight of the tapered triblock copolymer; and
      (iii) a monovinyl aromatic monomer content of at least 5 percent weight based on the total amount of monovinyl aromatic monomer in the tapered triblock copolymer; and
   (c) the A block comprises a polymer block of at least one monovinyl aromatic monomer, wherein the A block ranges from about 17 to about 31 wt % of the tapered triblock copolymer, and
   wherein the amount of monovinyl aromatic monomer in the tapered triblock copolymer is no more than about 53 wt %.

2. The composition of claim 1, wherein
   (a) the peak average molecular weight (Mp) of the tapered triblock copolymer is from about 118,000 to about 163,000 g/mol;
   (b) the total amount of monovinyl aromatic monomer in the tapered triblock copolymer is from about 33 percent weight to about 55 percent weight; and (c) the total vinyl configuration content is from about 10 percent weight to about 90 percent weight based on the total amount of conjugated diene in the tapered triblock copolymer.

3. The composition of claim 1, wherein the monovinyl aromatic monomer is styrene, and wherein the conjugated diene monomer is selected from the group consisting of butadiene and isoprene.

4. The composition of claim 1, where conjugated diene units are selectively, partially or fully hydrogenated.

5. The composition of claim 1, wherein the tapered triblock copolymer has the general configuration [B-(B/A)-A]n-X or X-[B-(B/A)-A]n where X is the residue of either a coupling agent or a multifunctional initiator and n is an integer from 2 to about 30, and mixtures thereof, wherein:
  (a) the number average molecular weight of the tapered triblock copolymer is from about 30,000 to about 1,000,000 g/mol;
  (b) the total amount of monovinyl aromatic monomer in the tapered triblock copolymer is from about 10 percent weight to about 85 percent weight; and
  (c) the total vinyl configuration content is from about 10 percent weight to about 90 percent weight based on the total amount of conjugated diene in the tapered triblock copolymer.

6. The composition of claim 5, wherein said monovinyl aromatic monomer is styrene and said conjugated diene is selected from the group consisting of butadiene and isoprene.

7. The composition of claim 5, wherein conjugated diene units are selectively, partially or fully hydrogenated.

8. The composition of claim 5, wherein either:
  (a) the tapered triblock copolymer with general configuration [B-(B/A)-A]n-X is either totally or partially coupled with a coupling agent; or
  (b) the tapered triblock copolymer with general configuration X-[B-(B/A)-A]n is either totally or partially initiated with a multifunctional initiator.

9. A process for making tapered triblock copolymers, comprising: reacting at least one conjugated diene monomer and at least one monovinyl aromatic monomer under anionic polymerization conditions in the presence of a suitable polar additive or combination of polar additives; and forming the composition according to claim 1.

10. A process for making a tapered triblock copolymer, comprising:
  adding conjugated diene and monovinyl aromatic monomers to a reactor, wherein more conjugated diene monomer than monovinyl aromatic monomer is added (on a weight basis) to the reactor;
  adding a polar modifier to the reactor;
  adding an initiator to the reactor and polymerizing the monomers to make a first block,
  adding additional conjugated diene monomer and/or additional monovinyl aromatic monomer to the reactor ad polymerizing to form a second block, wherein the second block has a lesser proportion of the conjugated diene monomer than the proportion of conjugated diene monomer in the first block; and
  forming a third block, wherein the third block is a homopolymer of the monovinyl aromatic monomer, thereby forming the composition according to claim 1.

11. The process of claim 10, wherein the first and third blocks are end blocks, wherein the second block is a middle block between the first and third blocks, and wherein the second block is bound directly to the first and third blocks.

12. The process of claim 11, wherein the proportion of the first block is at least about one-third of the weight of the first, second and third blocks.

13. The process of claim 12, wherein the proportion of the second block is at least about one-quarter of the weight of the first, second and third blocks.

14. The process of claim 13, wherein the proportion of the third block is less than about one-third of the weight of the first, second and third blocks.

15. The process of claim 14, wherein the proportion of the first block is no more than about one-half of the weight of the first, second and third blocks.

16. The process of claim 15, wherein the proportion of the second block is no more than about one-half of the weight of the first, second and third blocks.

17. The process of claim 16, wherein the proportion of the third block is at least about 15% of the weight of the first, second and third blocks.

18. The process of claim 10, wherein the proportion of the conjugated diene in the first block is at least about 75 wt.

19. The process of claim 18, wherein the proportion of the conjugated diene in the second block is no more than about 61 wt %.

20. The process of claim 19, wherein the proportion of the conjugated diene in the first block ranges between about 75 and about 87 wt % of the first block.

21. The process of claim 20, wherein the proportion of the conjugated diene in the second block ranges between about 47 and about 55 wt % of the second block.

22. The process of claim 21, wherein the conjugated diene is 1,3 butadiene or isoprene.

23. The process of claim 22, wherein the monovinyl aromatic monomer is styrene.

24. The process of claim 10, wherein the peak average molecular weight of the tapered triblock copolymer ranges between about 50,000 to about 200,000.

25. The process of claim 24, wherein the peak average molecular weight of the first block ranges between about 50,000 to about 70,000.

26. The process of claim 25, wherein the number average molecular weight of the third block ranges between about 10,000 to about 50,000.

27. The process of claim 24, wherein the Mooney viscosity of the tapered triblock copolymer ranges between about 25 to about 50.

28. The process of claim 27, wherein the 1,2-addition vinyl content in the first block ranges between about 25 and about 34%.

29. A process for making a tapered triblock copolymer, comprising:
  adding a solvent, a polar modifier and conjugated diene and monovinyl aromatic monomers to a reactor to form an initial reaction mixture, wherein the amount of the polar modifier in the initial reaction mixture is less than 10 wt %;
  adding an organolithium initiator compound to the reactor and anionically polymerizing the monomers to form a first and block, wherein the conjugated diene monomer in the first block ranges between 70 and 90 wt %;
  adding additional conjugated diene monomer and/or additional monovinyl aromatic monomer to the reactor and polymerizing to form a second block, wherein the conjugated diene monomer in the second block ranges between 45 and 66 wt %; and
  forming a third block, which is another end block, thereby forming the tapered triblock copolymer, wherein the third block is a homopolymer of the monovinyl aromatic monomer, wherein the second block is bound directly to the first and third blocks, wherein the first block comprises 34 to 51 wt % of the tapered triblock copolymer, wherein the second block comprises 24 to 46 wt % of the tapered triblock copolymer, wherein the third block comprises 17 to 31 wt % of the tapered triblock copolymer, wherein the amount of monovinyl aromatic monomer in the tapered triblock copolymer is no more than about 53 wt %, wherein the solvent, the polar modifier, the conjugated diene monomer and the monovinyl aromatic monomers comprise a total reaction mixture, wherein the polar modifier is less than 5 wt % of the total reaction mixture, wherein the peak average molecular weight of the tapered triblock copolymer is between 75,000 and 250,000, wherein the peak average molecular weight of the first block is between 40,000 and 80,000, and wherein the number average molecular weight of the third block is between 5,000 and 40,000.

30. A tapered triblock copolymer composition, comprising:

first and second end blocks and a middle block between and bound directly to the first and second end blocks;

the first end block and the middle block comprising a copolymer of conjugated diene and monovinyl aromatic monomers and the second and block comprising a monovinyl aromatic polymer;

the first end block comprising 30 to 60 wt % of the tapered triblock copolymer, wherein the first end block contains an amount of conjugated diene monomer of from about 70 to about 90 wt %;

the middle block comprising 20 to 50 wt % of the tapered triblock copolymer, wherein the middle block contains an amount of conjugated diene monomer of from about 45 to about 66 wt %;

the second end block comprising 10 to 40 wt % of the tapered triblock copolymer; and the tapered triblock copolymer having a peak average molecular weight between about 118,000 and about 250,000, wherein the amount of monovinyl aromatic monomer in the tapered triblock copolymer is from about 33 to about 53 wt %.

31. The composition of claim 30, wherein the first end block and the middle block each have a peak average molecular weight between about 15,000 and about 150,000, and wherein the second end block has a number average molecular weight between about 2,500 and about 100,000, and wherein the Mooney viscosity of the tapered triblock copolymer ranges from about 25 to about 50.

32. The composition of claim 1, wherein the amount of monovinyl aromatic monomer in the tapered triblock copolymer is at least about 33 wt %.

33. The composition of claim 32, wherein the amount of monovinyl aromatic monomer in the B block is within the range of 12 to 19 wt % of the total amount of monovinyl aromatic monomer in the tapered triblock copolymer.

34. The composition of claim 32, wherein the amount of monovinyl aromatic monomer in the (B/A) block is within the range of 24 to 45 wt % of the total amount of monovinyl aromatic monomer in the tapered triblock copolymer.

35. The composition of claim 34, wherein the amount of monovinyl aromatic monomer in the (B/A) block is within the range of 34 to 55 wt % of the (B/A) block.

36. The composition of claim 34, wherein the amount of monovinyl aromatic monomer in the A block is within the range of 36 to 63 wt % of the total amount of monovinyl aromatic monomer in the tapered triblock copolymer.

37. The composition of claim 36, wherein the peak average molecular weight (Mp) of the A block is within the range of 12,000 to 27,000 g/mol.

38. A tapered triblock copolymer composition, comprising:

first and second end blocks and a middle block between and bound directly to the first and second end blocks, wherein:

the first end block and the middle block are each a copolymer of a conjugated diene and styrene, the conjugated diene is butadiene and/or isoprene, the second end block is a styrene polymer, the first end block is within the range of 34 to 51 wt % of the triblock copolymer, the first end block is 70 to 90 wt % conjugated diene and 10 to 30 wt % styrene, the first end block has a 1,2-addition-vinyl content of 20 to 41 wt % of the amount of the conjugated diene in the first block, the middle block is within the range of 25 to 45 wt % of the triblock copolymer, the middle block is 46 to % conjugated diene and 34 to 54 wt % styrene, the second end block is within the range of 17 to 31 wt % of the triblock copolymer, the styrene content of the triblock copolymer is within the range of 33 to 53 wt %, and wherein the content of the conjugated diene in the triblock copolymer is within the range of 45 to 67 wt %.

39. The tapered triblock copolymer composition of claim 38, wherein the peak average molecular weight (Mp) of the triblock copolymer is within the range of 118,000 to 163,000 g/mol.

40. The taped triblock copolymer composition of claim 39, wherein the peak average molecular weight (Mp) of the first and second end blocks is within the range of 50,000 to 70,000 and 12,000 to 27,000 g/mol, respectively.

* * * * *